US012421779B2

(12) United States Patent
Talpe

(10) Patent No.: US 12,421,779 B2
(45) Date of Patent: Sep. 23, 2025

(54) DASHPOT FOR DAMPING A CLOSING MOVEMENT OF A CLOSURE SYSTEM

(71) Applicant: LOCINOX, Waregem (BE)

(72) Inventor: Joseph Talpe, Heestert-Zwevegem (BE)

(73) Assignee: LOCINOX, Waregem (BE)

( * ) Notice: Subject to any disclaimer, the term of this patent is extended or adjusted under 35 U.S.C. 154(b) by 0 days.

(21) Appl. No.: 17/905,193

(22) PCT Filed: Mar. 1, 2021

(86) PCT No.: PCT/EP2021/055031
§ 371 (c)(1),
(2) Date: Aug. 29, 2022

(87) PCT Pub. No.: WO2021/170871
PCT Pub. Date: Sep. 2, 2021

(65) Prior Publication Data

US 2023/0146774 A1 May 11, 2023

(30) Foreign Application Priority Data

Feb. 28, 2020 (EP) .................................... 20160266

(51) Int. Cl.
*E05F 3/12* (2006.01)
*E05F 1/12* (2006.01)
*E05F 3/20* (2006.01)

(52) U.S. Cl.
CPC .............. *E05F 3/12* (2013.01); *E05F 1/1207* (2013.01); *E05F 3/20* (2013.01);
(Continued)

(58) Field of Classification Search
CPC .. E05F 3/12; E05F 1/1207; E05F 3/20; E05Y 2201/256; E05Y 2201/266;
(Continued)

(56) References Cited

U.S. PATENT DOCUMENTS 4,829,628 A * 5/1989 Vuksic ...................... E05F 3/20 16/DIG. 9
5,152,029 A * 10/1992 Pai ............................ E05F 3/20 16/54
(Continued)

FOREIGN PATENT DOCUMENTS

EP 1 094 185 A1 4/2001
EP 1 907 712 B1 12/2008
(Continued)

*Primary Examiner* — Jason W San
*Assistant Examiner* — Matthew J Sullivan
(74) *Attorney, Agent, or Firm* — FisherBroyles, LLP; Roger L. Browdy; Ronni S. Jillions

(57) ABSTRACT

A dashpot comprising: a closed cylinder cavity and a damper shaft (24) which are rotatable with respect to one another; a piston (47) which is slideable between two extreme positions; and a motion converting mechanism to convert the relative rotation between the cylinder barrel (17) and the damper shaft (24) into a sliding motion of the piston (47). The motion converting mechanism comprises two co-operating screw threads, one (58) being provided on an outer wall of the piston (47) and the other one being provided on an inner wall of the cylinder barrel (17) or on an inner wall of a plastic tubular element fixed to the cylinder barrel. By providing the screw thread (58) on the outside of the piston (47), the diameter of the screw thread (58) is increased thereby increasing its lead and thus causing a higher volume of hydraulic fluid to be displaced during operation of the dashpot.

40 Claims, 18 Drawing Sheets

(52) U.S. Cl.
CPC ... *E05Y 2201/256* (2013.01); *E05Y 2201/266* (2013.01); *E05Y 2201/484* (2013.01); *E05Y 2201/696* (2013.01); *E05Y 2800/674* (2013.01); *E05Y 2800/676* (2013.01); *E05Y 2800/68* (2013.01); *E05Y 2800/683* (2024.05); *E05Y 2900/40* (2013.01)

(58) Field of Classification Search
CPC ......... E05Y 2201/484; E05Y 2201/696; E05Y 2800/674; E05Y 2800/676; E05Y 2800/68; E05Y 2900/40
See application file for complete search history.

(56) References Cited

U.S. PATENT DOCUMENTS

| | | | | |
|---|---|---|---|---|
| 6,205,619 | B1 * | 3/2001 | Jang | E05F 3/20 16/50 |
| 6,464,052 | B1 | 10/2002 | Hsiao | |
| 9,206,636 | B2 * | 12/2015 | Nagl | E05F 1/1215 |
| 9,605,462 | B2 * | 3/2017 | Bacchetti | E05F 3/20 |
| 9,926,732 | B2 * | 3/2018 | Bacchetti | E05F 3/20 |
| 10,604,978 | B2 * | 3/2020 | Wu | E05D 11/1014 |
| 10,633,905 | B2 * | 4/2020 | Feng | E05F 1/1223 |
| 10,829,975 | B2 * | 11/2020 | Wu | E05F 1/066 |
| 10,837,213 | B2 * | 11/2020 | Talpe | E05F 3/12 |
| 10,858,873 | B2 * | 12/2020 | Talpe | E05F 1/1207 |
| 11,248,409 | B2 * | 2/2022 | Makihira | E05F 15/565 |
| 11,319,741 | B2 * | 5/2022 | Talpe | E05F 3/08 |
| 11,401,744 | B2 * | 8/2022 | Farrugia | E05F 3/20 |
| 2005/0044661 | A1 * | 3/2005 | Cho | E05F 1/1223 16/76 |
| 2011/0302743 | A1 * | 12/2011 | Kim | E05F 1/1215 16/248 |
| 2013/0047512 | A1 * | 2/2013 | Bongiovanni | E05F 3/20 49/386 |
| 2017/0122019 | A1 * | 5/2017 | Talpe | E05F 3/08 |
| 2019/0145141 | A1 * | 5/2019 | Jo | E05F 3/20 16/54 |
| 2020/0332581 | A1 * | 10/2020 | Balbo di Vinadio | E05F 3/20 |
| 2021/0180381 | A1 * | 6/2021 | Wu | E05D 3/02 |

FOREIGN PATENT DOCUMENTS

| | | | | |
|---|---|---|---|---|
| EP | 2119860 | A1 | 11/2009 | |
| EP | 2 356 304 | B1 | 10/2012 | |
| EP | 3 067 499 | A1 | 9/2016 | |
| EP | 3 342 965 | A1 | 4/2018 | |
| EP | 3 575 617 | A1 | 12/2019 | |
| WO | 2014054028 | A1 | 4/2014 | |
| WO | WO-2018121890 | A1 * | 7/2018 | E05F 3/08 |
| WO | 2018/228729 | A1 | 12/2018 | |

* cited by examiner

DASHPOT FOR DAMPING A CLOSING MOVEMENT OF A CLOSURE SYSTEM

The present invention relates to a dashpot for damping a closing movement of a closure system having a support and a closure member that are hingedly connected to each other. The present invention also relates to a hinge or an actuator comprising the dashpot. The present invention further relates to a set of hinges at least one of which comprises the dashpot.

A first type of known dashpot comprises a plastic cylinder barrel having a longitudinal direction; a closed cylinder cavity formed within the cylinder barrel and being filled with a volume of hydraulic fluid; a damper shaft which is fixed to one of the two hinge members and which extends into the cylinder cavity, the cylinder barrel and the damper shaft being rotatable with respect to one another about a rotation axis which is substantially parallel to the longitudinal direction; a piston within said cylinder cavity which is operatively coupled to said damper shaft to be movable between two extreme positions in said longitudinal direction upon a relative rotation between said cylinder barrel and said damper shaft; and a motion converting mechanism to convert the relative rotation between said cylinder barrel and said damper shaft into a sliding motion of the piston in the cylinder barrel. The motion converting mechanism comprises two screw threads which are arranged to cooperate with one another so that upon a relative rotation between said cylinder barrel and said damper shaft in a first rotational direction the piston moves along the damper shaft in a first direction whilst upon a relative rotation between said cylinder barrel and said damper shaft in a second rotational direction, which is opposite to the first rotational direction, the piston moves along the damper shaft in a second direction, which is opposite to the first direction, the first and second directions being substantially parallel to the longitudinal direction of the cylinder barrel.

Such a dashpot is disclosed in EP 1 094 185 A1 and is part of a barrel hinge having two hinge members that are pivotably mounted to one another. The first hinge member comprises a hollow in which a plastic cylinder barrel is removably mounted. The cylinder barrel is prevented from rotating with respect to the hollow part of the first hinge member by one or more grooves in the wall of the hollow into which corresponding ribs on the outside wall of the cylinder barrel are fitted. In a similar fashion, the top part of the damper shaft is prevented from rotating with respect to the second hinge member. The piston is also prevented from rotating with respect to the cylinder barrel by using a similar principle, namely by providing one or more grooves in the inner wall of the cylinder barrel and one or more corresponding ribs on the outer surface of the piston. As both hinge members are rotatable with respect to one another, the damper shaft is rotatable with respect to the cylinder barrel and with respect to the piston. Such a rotational motion of the damper shaft is transformed into a sliding motion of the piston in the cylinder barrel by the use of two complementary screw threads disposed on the inner surface of the piston and the outer surface of the damper shaft.

As the hinge disclosed in EP 1 094 185 A1 is formed as a barrel hinge, the hinge always has to be mounted in the same upright position. Consequently, the hinge can normally not be used for differently oriented closure members.

A second type of known dashpot comprises: a metal cylinder barrel having a longitudinal direction; a closed cylinder cavity formed within the cylinder barrel and being filled with a volume of hydraulic fluid; a damper shaft which extends into the cylinder cavity, the cylinder barrel and the damper shaft being rotatable with respect to one another about a rotation axis which is substantially parallel to the longitudinal direction; a piston within said cylinder cavity which is operatively coupled to said damper shaft to be movable between two extreme positions in said longitudinal direction upon a relative rotation between said cylinder barrel and said damper shaft; and a motion converting mechanism to convert the relative rotation between said cylinder barrel and said damper shaft into a sliding motion of the piston. The motion converting mechanism comprises: a plastic tubular element that is fixed to said cylinder barrel; and two screw threads which are arranged to cooperate with one another so that upon a relative rotation between said cylinder barrel and said damper shaft in a first rotational direction the piston moves along the damper shaft in a first direction whilst upon a relative rotation between said cylinder barrel and said damper shaft in a second rotational direction, which is opposite to the first rotational direction, the piston moves along the damper shaft in a second direction, which is opposite to the first direction, the first and second directions being substantially parallel to the longitudinal direction.

Such a dashpot is disclosed in WO 2018/121890 A1 and is used both in a barrel hinge having two hinge members that are pivotably mounted to one another and in an actuator that is separately attached to the closure system. The damper shaft and the cylinder barrel are rotatable with respect to one another as each is fixed to a different part of the closure system. A guiding element made from a synthetic material is disposed in the cylinder barrel and securely fixed to a collar thereof. The guiding element is provided with grooves and the piston is provided with corresponding ribs on its outer wall such that rotation of the piston with respect to the cylinder barrel is prevented. A rotational motion of the damper shaft is transformed into a sliding motion of the piston in the cylinder barrel by the use of two complementary screw threads disposed on the inner surface of the piston and the outer surface of the damper shaft.

A general issue with dashpots is that a stable operation requires a sufficient volume of hydraulic fluid to be displaced. While this may be achieved by enlarging the closed cylinder cavity, such a solution also increases the size of the hinge or actuator in which the dashpot is present, which is undesirable.

In the dashpots disclosed in EP 1 094 185 A1 and WO 2018/121890 A1, there is a one-way valve present in the piston to allow hydraulic fluid flow along a by-pass when opening the closure member. However, when closing the closure member, this one-way valve is closed such that hydraulic fluid has to flow along a restricted fluid passage thereby damping the closing movement. This restricted fluid passage is formed (in part) by hydraulic fluid flowing along the piston in the space between the piston and the damper shaft and the piston and the cylinder barrel wall. However, this damping is subject to environmental influences. Temperature changes will affect the viscosity of the hydraulic fluid in such a way that the damping force increases as temperature increases. This is a particular problem for outdoor applications where the hinge may be subject to large temperature variations. For example, summer temperatures up to 70° C. when the hinge is exposed to direct sunshine and winter temperatures below −30° C. are not uncommon, i.e. temperature variations up to and possibly even exceeding 100° C. are possible.

It is an object of the present invention to provide a dashpot which has an improved operation without having to be more voluminous.

This object is achieved according to the invention in that a first one of said two screw threads is provided on an outer wall of the piston and a second one of said two screw threads is provided on an inner wall of the cylinder barrel, with the piston being slideable along said longitudinal direction on said damper shaft and with a rotation prevention system being provided between the piston and said damper shaft for preventing rotation of the piston with respect to the damper shaft.

This object is also achieved according to the invention in that a first one of said two screw threads is provided on an outer wall of the piston and a second one of said two screw threads is provided on an inner wall of the plastic tubular element which is arranged in the cylinder barrel and fixed thereto, with the piston being slideable along said longitudinal direction on said damper shaft and with a rotation prevention system being provided between the piston and said damper shaft for preventing rotation of the piston with respect to either the damper shaft.

By providing the screw thread on the outside of the piston as opposed to on the inside of the piston as in the dashpots disclosed in EP 1 094 185 A1 and WO 2018/121890 A1, the diameter of the screw thread is increased thereby increasing the lead of the screw thread while maintaining the same helix angle. By increasing the lead of the screw thread, the piston slides over a greater distance during operation of the hinge, which greater distance causes a higher volume of hydraulic fluid to be displaced thereby improving the operation, in particular the reliability, of the hinge.

Moreover, this increased lead is achieved without having to modify the outside dimensions of the dashpots disclosed in EP 1 094 185 A1 and WO 2018/121890 A1 thus not negatively affecting the compactness.

Furthermore, by increasing the diameter of the screw thread, the helix angle may be decreased while the lead of the screw thread is maintained. Decreasing the helix angle is advantageous as this reduces the frictional forces between the two screw threads. Consequently, the dashpot operates more easily and more smoothly. This may also lead to a reduction in the size of the hinge as lower force requirements may lead to a smaller self-closing mechanism for the hinge.

Additionally, both effects may be combined such that, by increasing the screw thread diameter, the helix angle may be reduced while still increasing the lead thereby improving the reliability and decreasing the force requirements while maintaining the outside diameter of the cylinder barrel.

Whilst the lead of the screw thread may also be increased by increasing the helix angle, such a solution is not preferred. In particular, increasing the helix angle also increases the friction between the screw threads, i.e. between the piston and the cylinder barrel, which complicates normal operation of the dashpot.

In an embodiment of the present invention said cylinder barrel has a first end and a second end, said damper shaft extending at least from said first end to said second through the cylinder barrel, and in that the dashpot further comprises: a first roller bearing, preferably a ball bearing, disposed around the damper shaft near the first end of the cylinder barrel; and a second roller bearing, preferably a ball bearing, disposed around the damper shaft near the second end of the cylinder barrel.

In this embodiment the damper shaft extends through the cylinder barrel and is radially held in place by two roller bearings at each end of the cylinder barrel. By securing the radial position of the damper shaft at two locations along its length, which locations are separated from one another with a relatively large distance, possible radial movements of the damper shaft with respect to the cylinder barrel are minimized. The damper shaft is also particularly suited to be used as hinge shaft.

In a preferred embodiment of the present invention the dashpot comprises a first and a second annular seal to seal the closed cylinder cavity at both its end around the damper shaft.

Since the damper shaft extends through the cylinder barrel, it likewise extends through the closed cylinder cavity. There is thus a risk of hydraulic fluid leaking via the openings in the closed cylinder cavity along which the damper shaft extends. This risk is increased because the cylinder barrel, including the closed cylinder cavity, and the damper shaft undergo a relative rotation during operation of the hinge. The annular seals provide a convenient way to seal the closed cylinder cavity around the damper shaft.

In a preferred embodiment of the present invention the dashpot is configured to be irrotatably fixed to the closure system with its longitudinal axis in a first orientation for a right-handed closure member and in a second orientation, opposite to the first orientation, for a left-handed closure member.

This embodiment provides an easy solution to provide a dashpot for both left-handed and right-handed closure members. Specifically, for a right-handed closure member, the cylinder barrel is mounted to one of: the support and the closure member with its longitudinal axis in a first orientation (e.g. upright or upside down) and the shaft is connected to the other one of: the support and the closure member via the second hinge member. For a left-handed closure member, the cylinder barrel is mounted to one of: the support and the closure member with its longitudinal axis in a second orientation that is opposite to the first orientation (e.g. upside down or upright) and the shaft is connected to the other one of: the support and the closure member via the second hinge member. Irrespective of the orientation, the relative rotational motion of the damper shaft with respect to the cylinder barrel has the same direction (e.g. clockwise or counter-clockwise depending on how the dashpot is configured).

Moreover, when the dashpot is provided in a hinge, this allows always placing the same hinge member to the support and the other one to the closure member. This is particularly advantageous when the shape of the hinge members is chosen to correspond in part to the shape of the support or the closure member. A same advantage is obtained when the dashpot is provided in an actuator as the actuator may then always be mounted to the same element, i.e. the support or the closure member.

The principle of mounting a dashpot, included in a hinge, in different orientations depending on the handedness of the closure member has already been disclosed in EP 3 342 965 A1 albeit with a damper shaft that does not extend through the cylinder barrel. In this hinge, the roller bearings are both placed centrally in the hinge, i.e. both on a same side of the cylinder barrel. The advantage described above of having axially spaced roller bearings is thus not achieved in the known hinge.

A similar mounting principle for a dashpot, included in a hydraulically damped actuator, with a damper shaft that extends through the cylinder barrel has been disclosed in WO 2018/228729 A1.

In a preferred embodiment of the present invention the dashpot further comprises two annular positioning elements located in a corresponding groove provided in the damper shaft, wherein the inner race of the roller bearings axially engages a corresponding annular positioning element with the roller bearings being located between the annular positioning elements, and in that the cylinder barrel is provided with two transverse abutment surfaces, wherein the outer race of the roller bearings axially engages a corresponding transverse abutment surface with the transverse abutment surfaces being located between the roller bearings.

Such a configuration is advantageous when considering that the damper shaft may be subjected to a force in the direction of the longitudinal axis, which may, for example, be generated by the dashpot. In either direction of the force, the damper shaft will transmit the force, via the annular positioning elements, to the inner race of either the first or the second roller bearing. The roller bearings will transfer this force to their outer race and thus to the cylinder barrel, via the abutment surfaces. In other words, the configuration of the roller bearings with the annular positioning elements and the transverse abutment surfaces ensures that the damper shaft is securely fixed in the direction of the longitudinal axis, i.e. axially.

In an embodiment of the present invention the damper shaft is made of metal, preferably of aluminium. The term aluminium embraces all kinds of aluminium alloys.

A metal damper shaft is preferred to a damper shaft made of a synthetic material for several reasons. Whilst the required strength in as compact a damper shaft as possible (i.e. a damper shaft with as small a radius as possible) is achievable using both a metal or a synthetic material, the metal option is often cheaper. Moreover, as will be described below, a metal damper shaft makes it easier to compensate for temperature influences on the hydraulic fluid.

In a preferred embodiment of the present invention the piston divides the closed cylinder cavity into a high pressure compartment and a low pressure compartment, wherein the dashpot further comprises: a one-way valve allowing fluid flow from the low pressure compartment to the high pressure compartment when said closure member is being opened; and a restricted fluid passage between the high pressure compartment and the low pressure compartment which determines a closing speed of the closure member.

Preferably said threads are disposed within the high pressure compartment. By placing the threads within the high pressure compartment, the closer the closure member is to being closed, the larger the area where the threads are engaged. Consequently, the closing forces are distributed over a larger thread surface area while closing the closure member. This reduces the risk that one or more threads would be damaged, for example due to excessive forces during closing of the closure member, e.g. because a person is actively pushing on the closure member. This would be exactly the opposite when the threads would be placed in the low pressure compartment. In other words, the placement of the threads reduces the risk of damaging the hinge during operation.

Furthermore, as the typical opening and closing motion is less than the maximal opening angle (e.g. between 50° and 60° with a maximal opening angle of 170°), the surface engagement of the screw threads is large during normal use, whilst it would we much lower in case the screw threads would be placed in the low pressure compartment.

Preferably the dashpot comprises an adjustable valve, in particular an adjustable needle, configured to regulate a fluid flow through said restricted fluid passage. By providing an adjustable valve that regulates the flow of hydraulic fluid through the restricted fluid passage, it is possible to modify the closing speed of the closure member. In particular, by decreasing the flow rate through the restricted fluid passage, the closing speed will be decreased, and vice versa.

In a more preferred embodiment of the present invention said restricted fluid passage comprises a bore that extends substantially in the direction of said longitudinal axis, said adjustable valve being placed in said bore, said adjustable valve being made from a material, in particular a synthetic material, preferably having a higher thermal expansion coefficient than the material wherein said bore is made, which is preferably a metal.

Forming the restricted fluid passage in the damper shaft is space efficient and enables to make a relatively long bore which enables to house a relatively long valve. At least one extremity of the damper shaft is also accessible to enable to adjust the valve, i.e. the position of the needle in the bore. Moreover, the passage is then formed in a metal element, which would not be the case when the restricted fluid passage would be formed, for example, in a plastic cylinder barrel wall.

Furthermore, the restricted fluid passage is formed by a clearance between the adjustable valve and the bore within the damper shaft. The adjustable valve has in particular elongated and has a first extremity and a second extremity, the restricted fluid passage being formed by a clearance between the adjustable valve and the bore within the damper shaft near the first extremity of the adjustable valve whilst the adjustable valve is fixed in said bore near its second extremity. The adjustable valve has preferably a screw thread near its second extremity by means of which it is screwed into the bore. By forming the adjustable valve from a material with a relatively (compared to the damper shaft) high thermal expansion coefficient, the clearance will decrease when the temperature of the hinge is raised and vice versa. Consequently, the thermal expansion coefficient difference between the valve and the damper shaft tends to open the clearance between them at lower temperatures and close it at higher temperatures thereby automatically compensating for the thermal variation in viscosity of the hydraulic fluid.

A similar principle has been disclosed in EP 3 067 499 A1 for a hydraulically damped actuator where the thermal expansion coefficient difference was present between the piston and the cylinder barrel and the restricted fluid passage was partly formed therebetween.

In a more preferred embodiment of the present invention the damper shaft extends through the piston, at least one first sealing ring being provided between the piston and the cylinder barrel and at least one second sealing ring being provided between the piston and the damper shaft. The dashpot further comprises in other words a first and a second sealing ring to seal the high pressure compartment, the first sealing ring being provided on an inner surface of the piston in contact with the damper shaft and the second sealing ring being provided on the outer surface of the piston in contact with the inner wall of the cylinder barrel.

Providing these sealing rings ensures that the restricted fluid passage is only formed within the damper shaft as opposed to between the piston and the cylinder barrel and damper shaft as in the hinge disclosed in EP 1 094 185 A1. In other words, the restricted fluid passage is only formed by a single passage as opposed to multiple passages in the known hinge, such that the hydraulic fluid flow can be more accurately and more reliably controlled. The control can be either manually, by adjusting the position of the valve in the bore or automatically, by a change of temperature which modifies the relative length of the valve with respect to the length of the bore. Since less hydraulic fluid flows in an unadjustable way, the dimensions of the daskpot may be reduced, in particular to be able to incorporate it in a relatively compact hing.

Furthermore, as the first hinge member, including the cylinder barrel, is made of a synthetic material, it is more prone to deformations when compared to a metal cylinder barrel as disclosed in EP 3 067 499 A1. Therefore, whilst it is possible to provide the restricted fluid passage between the piston and the cylinder barrel, there is a risk of cylinder barrel deformations that would affect the cross-sectional area of the restricted fluid passage (i.e. the closing speed of the closure member). As such, providing the second sealing ring is advantageous to improve the reliability of the hinge.

Moreover, as the first sealing ring contacts the damper shaft, a metal damper shaft is advantageous as it is easier to achieve a sufficient sealing when compared to a damper shaft made of a synthetic material. Furthermore, the metal damper shaft is typically less prone to wear at the location of the sealing ring when compared to a damper shaft made of a synthetic material.

In an even more preferred embodiment of the present invention the sealing rings are formed by a sealing member, in particular an integrally formed sealing member. Preferably, the piston comprises a base and the sealing member, wherein the piston is formed by multi-material injection moulding, in particular over-moulding.

A sealing member is advantageous as this requires fewer manufacturing steps. In particular, only a single member needs to be applied to the piston instead of two rings. Moreover, the piston (both the base part and the sealing member) may be formed in a single manufacturing process such as multi-material injection moulding, in particular over-moulding, leading to an easy production and an exact fit of the sealing member to the remaining part of the piston.

In an embodiment of the present invention the rotation prevention system comprises: at least one rib provided on one of the damper shaft and an inner surface of the piston, each rib having two side faces extending radially outwards from the damper shaft and a front connecting the side faces, wherein the imaginary planes that coincide with each side face are either radial planes bisecting substantially near the rotation axis of the damper shaft or form an angle of at most 10° with a radial plane containing said rotation axis and passing through the middle of said side faces; and at least one groove provided on the other one of the damper shaft and the inner surface of the piston, the groove being arranged to cooperate with the at least one rib and having in particular a shape corresponding to the at least one rib.

By providing a rib having side faces coinciding with bisecting imaginary planes, or forming an angle of at most 10° with respect to a radial plane, the force transfer between the ribs and the grooves, which transfer occurs by the side faces, is tangential to the possible movement direction of the piston, i.e. a rotational movement. In other words the coupling between the damper shaft and the piston is preferably a so-called star coupling. As such, no unnecessary forces act upon the piston, which forces could lead to rapid wear and deformation of the piston and/or the damper shaft. Furthermore, by providing the groove in the damper shaft as opposed to providing the rib thereon, a larger volume of hydraulic oil is possible in a same closed cylinder cavity.

In an embodiment of the present invention said screw threads each have at least 5 starts, preferably at least 8 starts and more preferably at least 10 starts. The screw threads are in other words multiple screw threads comprising at least 5, preferably at least 8 and more preferably at least 10 sub-threads.

In an embodiment of the present invention said screw threads each have a lead of at least 30 mm, preferably at least 40 mm and more preferably at least 50 mm.

In an embodiment of the present invention said threads each have a helix angle of at least 15°, preferably at least 20° and more preferably at least 25°.

It has been found that this allows to keep the dashpot as compact as possible as gearing or reduction is required between the cylinder barrel and the piston to achieve a sufficient piston displacement, i.e. a displacement of the piston causing a sufficient hydraulic fluid flow to ensure normal operation of the hinge in a smooth fashion.

In an embodiment of the present invention said threads each have a helix angle of less than 45°, preferably less than 40° and more preferably less than 35°.

Such a smaller helix angle enable an efficient conversion of the rotational motion of the damper shaft into a translational motion of the piston while reducing frictional forces and thus wear of the screw threads.

In an embodiment of the present invention the piston is made of a polymeric material, preferably a fibre, in particular glass fibre, reinforced polymeric material. This provides for a sufficiently strong piston that is able to handle the forces associated with the screw threads.

The object according to the present invention is also achieved with a hydraulically damped actuator for damping a closing movement of a closure system having a support and a closure member that are hingedly connected to each other, which actuator comprises the dashpot as described above.

The object according to the present invention is also achieved with a hydraulically damped hinge for hinging a closure member to a support, the hinge comprising: a first hinge member configured to be fixed to one of: the support and the closure member, the first hinge member comprising a cylinder barrel having a longitudinal direction; and a second hinge member pivotably mounted on the first hinge member, the second hinge member being configured to be fixed to the other one of: the support and the closure member, wherein said hinge members are made of a synthetic material and in that the hinge further comprises a dashpot as described above.

By using a dashpot as described above all advantages of the dashpot are also provided in the actuator and the hinge.

Additionally, as the hinge members are made of a synthetic material, it is possible to fabricate these integrally, e.g. by injection moulding. As opposed to the hinge member disclosed in EP 1 094 185 A1 where the cylinder barrel is distinct from the remainder of the hinge member, the cylinder barrel in the hinge according to the present invention may be integrally formed within the hinge member. This may avoid leeway between the hinge member and the cylinder barrel, which leeway could cause disruptions during operation of the closure member.

In an embodiment of the present invention the second hinge member comprises: a first tubular part disposed around the damper shaft at the first end of the cylinder barrel; a second tubular part disposed around the damper shaft at the second end of the cylinder barrel, said tubular parts being substantially aligned with the cylinder barrel; and a connecting part that connects the first and second tubular parts.

In this embodiment, the hinge is formed as a gate hinge with the first hinge member forming one knuckle, in particular formed by the cylinder barrel, with a leaf and the second hinge member forming two further knuckles (i.e. the tubular parts), surrounding the first knuckle, which are connected to one another by a further leaf (i.e. the connecting part). Typically the second hinge member will then be mounted on the support with the first hinge member being mounted on the closure member. Consequently, the damper shaft remains stationary during operation, while the cylinder barrel rotates when opening or closing the closure member.

In a preferred embodiment of the present invention the hinge further comprises a first and a second thrust washer disposed around the damper shaft, the first thrust washer being provided between the first tubular part and the first hinge member, the first thrust washer engaging in particular the outer race of a first roller bearing arranged between the cylinder barrel and the damper shaft, the second thrust washer being provided between the second tubular part and the first hinge member, the second thrust washer engaging in particular the outer race of a second roller bearing arranged between the cylinder barrel and the damper shaft. The first and the second thrust washers are preferably made of a friction reducing material.

The thrust washers act as the bearing surface for bearing the closure member on whichever hinge member is fixed to the support. For example, when the first hinge member is mounted on the closure member and second hinge member is mounted on the support, the lowermost thrust washer will bear the first hinge member irrespective of the orientation of the hinge.

In a preferred embodiment of the present invention at least one roller bearing is provided between the damper shaft and the first hinge member and the first hinge member is supported by the second hinge member through the intermediary of a first thrust bearing disposed between the cylinder barrel and the first tubular part and through the intermediary of a second thrust bearing disposed between the cylinder barrel and the second tubular part, said roller bearing having in particular an outer race interposed between the first hinge member and the second hinge member to support the first hinge member.

The thrust bearings enable to carry the weight of the closure member without putting stresses onto the one or more roller bearings which may be provided between the damper shaft and the cylinder barrel. The roller bearing or bearing may therefore be smaller which contributes to the compactness of the hinge.

In an embodiment of the present invention the hinge members are made of a fibre-reinforced synthetic material which comprises preferably between 20% and 60%, more preferably between 30% and 50%, by volume of glass fibres, the synthetic material being preferably polyamide, such as polyamide 6.

Use is made of fibre-reinforced synthetic material since the hinge members need to have the necessary mechanical properties to be able to carry the closure member Polyamide 6 with 40% glass fibres is a known composition that is known for its high rigidity and strength and its suitability for continuous exposure applications in an outside environment.

The object according to the present invention is also achieved with a set of hinges for hinging a closure member to a support, wherein the set comprises a hydraulically damped hinge as described above; and a further hinge comprising a first further hinge member configured to be fixed to one of: the support and the closure member and a second further hinge member pivotably mounted on the first further hinge member, the second further hinge member being configured to be fixed to the other one of: the support and the closure member, wherein an energy storing mechanism is provided in at least one of the hydraulically damped hinge and the further hinge, the energy storing mechanism being configured for storing energy when said closure member is being opened and for restoring said energy to effect closure of said closure member, the energy storing mechanism comprising a torsion spring having a first extremity connected to one of the first hinge member and the first further hinge member and a second extremity connected to a corresponding one of the second hinge member and the second further hinge member.

By using a hydraulically damped hinge as described above all advantages of that hinge are also provided in the set. Moreover, by providing an energy storing mechanism either in a further hinge or in the hydraulically damped hinge, the set of hinges becomes self-closing, i.e. the torsion spring will urge the closure member to its closed position.

Moreover, as the torsion spring may be provided in the further hinge, the total size of the hydraulically damped hinge may be kept to a minimum.

In an embodiment of the present invention the energy storing mechanism comprises a torsion spring disposed in the hydraulically damped hinge with its first extremity being connected to the first hinge member and with its second extremity being connected to the second hinge member. Preferably, the torsion spring defines a hypothetical cylinder with said at least said two screw threads being located substantially inside said hypothetical cylinder.

By providing the torsion spring in the hinge, the hinge acts as a self-closing hinge. Moreover, positioning the screw threads within the hypothetical cylinder results in a compact hinge as less height is required when compared to placing the screw threads mostly below or above the torsion spring.

In a preferred embodiment of the present invention the energy storing mechanism comprises a further torsion spring disposed in the further hinge with its first extremity being connected to the first further hinge member and with its second extremity being connected to the second further hinge member.

Providing two torsion springs is advantageous. Specifically, whilst a single torsion spring provided in the further hinge is sufficient to achieve a self-closing hinge set, the spatial distance between the further hinge and the hydraulically damped hinge (typically one is placed at the top of the closure member and the other one at the bottom) may cause a torque to be effected on the closure member. In particular, a closing force is provided at one end of the closure member, which force is opposed at its other end. It has been found that the provision of a secondary torsion spring in the hydraulically damped hinge alleviates or at least reduces this effect as part of the closing force now acts nearer the opposing force.

In a preferred embodiment of the present invention the energy storing mechanism comprises at least a third torsion spring, the second torsion spring being disposed in the hydraulically damped hinge with its first extremity being connected to the first hinge member and with its second extremity being connected to the first tubular part and the third torsion spring being disposed in the hydraulically damped hinge with its first extremity being connected to the first hinge member and with its second extremity being connected to the second tubular part.

In this preferred embodiment, two torsion springs are present in the hydraulically damped hinge, namely one between each tubular part and the cylinder barrel. This further reduces the torque issues caused by the torsion spring in the further hinge as even more of the closing force is provided near the opposing force. Moreover, the torsion springs in the hydraulically damped hinge are now located on both sides of the dashpot thereby avoiding or at least reducing a potential torque by having only a single torsion spring in the hydraulically damped hinge.

The invention will be further explained by means of the following description and the appended figures.

Figure 1A:
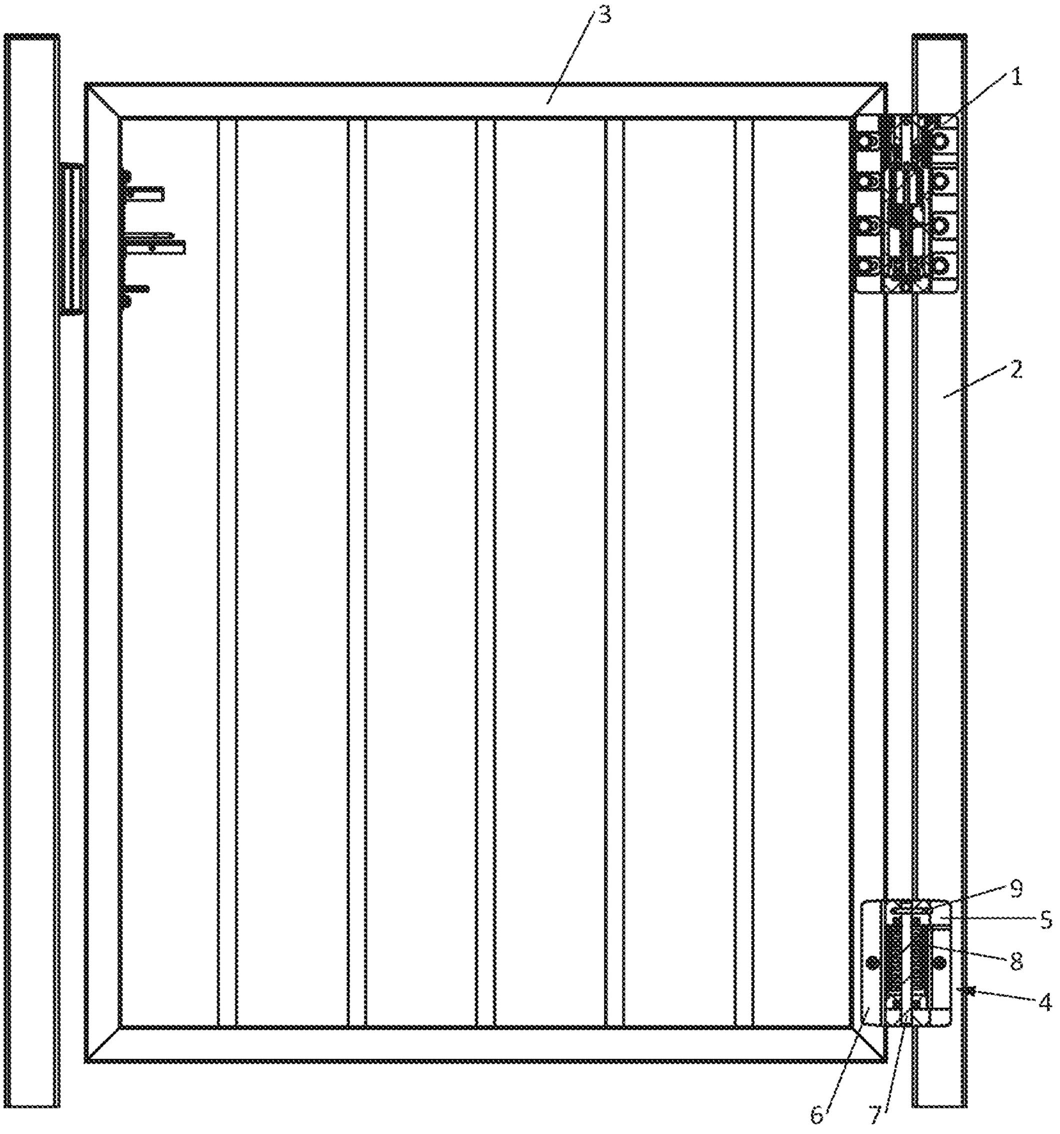
FIGS. 1A and 1B show a front side partially cross-sectioned view of a left-handed, respectively right-handed, closure member hinged to a support using a first embodiment of a hydraulically damped hinge according to the present invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes. The terms so used are interchangeable under appropriate circumstances and the embodiments of the invention described herein can operate in other orientations than described or illustrated herein.

Furthermore, the various embodiments, although referred to as "preferred" are to be construed as exemplary manners in which the invention may be implemented rather than as limiting the scope of the invention.

The invention generally relates to a dashpot for damping a closing movement of a closure system having a support and a closure member that are hingedly connected to each other. The dashpot will largely be described by reference to a hydraulically damped hinge as illustrated in FIGS. 1 to 10 and in FIGS. 11 to 15, but the dashpot should not be considered to be limited to applications within a hinge. In particular, applications of the dashpot in a hydraulically damped actuator are also within the scope of the invention. One example of such an actuator will be described with reference to FIGS. 16 and 17. Such an actuator is also arranged between a closure member and its support and is provided to effect closure of the closure member without functioning as hinge.

FIGS. 1 to 10 illustrate a first embodiment of a hydraulically damped hinge 1 for hingedly connecting a first member and a second member, the hinge 1 including a first embodiment of a dashpot according to the present invention. The first member is typically a fixed support 2, such as a wall or a post, while the second member is typically a moveable closure member 3, such as a gate, a door, or a window.

Typically a second hinge 4 is also used to hingedly connect the closure member 3 to the support 2. The invention therefore also relates to a set of hinges 1, 4 for hingedly connecting a closure member 2 to a support 3. In particular, the hinges 1, 4 are designed for an outdoors closure system that may be subjected to large temperature variations. In a typical application, it is desired to have the closure member 3 to be self-closing. This may be achieved generally by providing a hinge that comprises an energy storing mechanism and a dashpot both of which are operatively connected with the members of the closure system. The energy storing mechanism is configured for storing energy when the closure system is being opened and for restoring the energy to effect closure of the closure system. The dashpot is configured for damping a closing movement of the closure system and comprises a piston that is slideable along the longitudinal direction within the actuator between two extreme positions.

The dashpot and the energy storing mechanism may also be provided in different hinges of the set. For example, as illustrated in FIGS. 1A and 1B, the energy storing mechanism is provided in the bottom hinge 4, while the dashpot is provided in the top hinge 1 together with an additional energy storing mechanism.

Figure 1B:
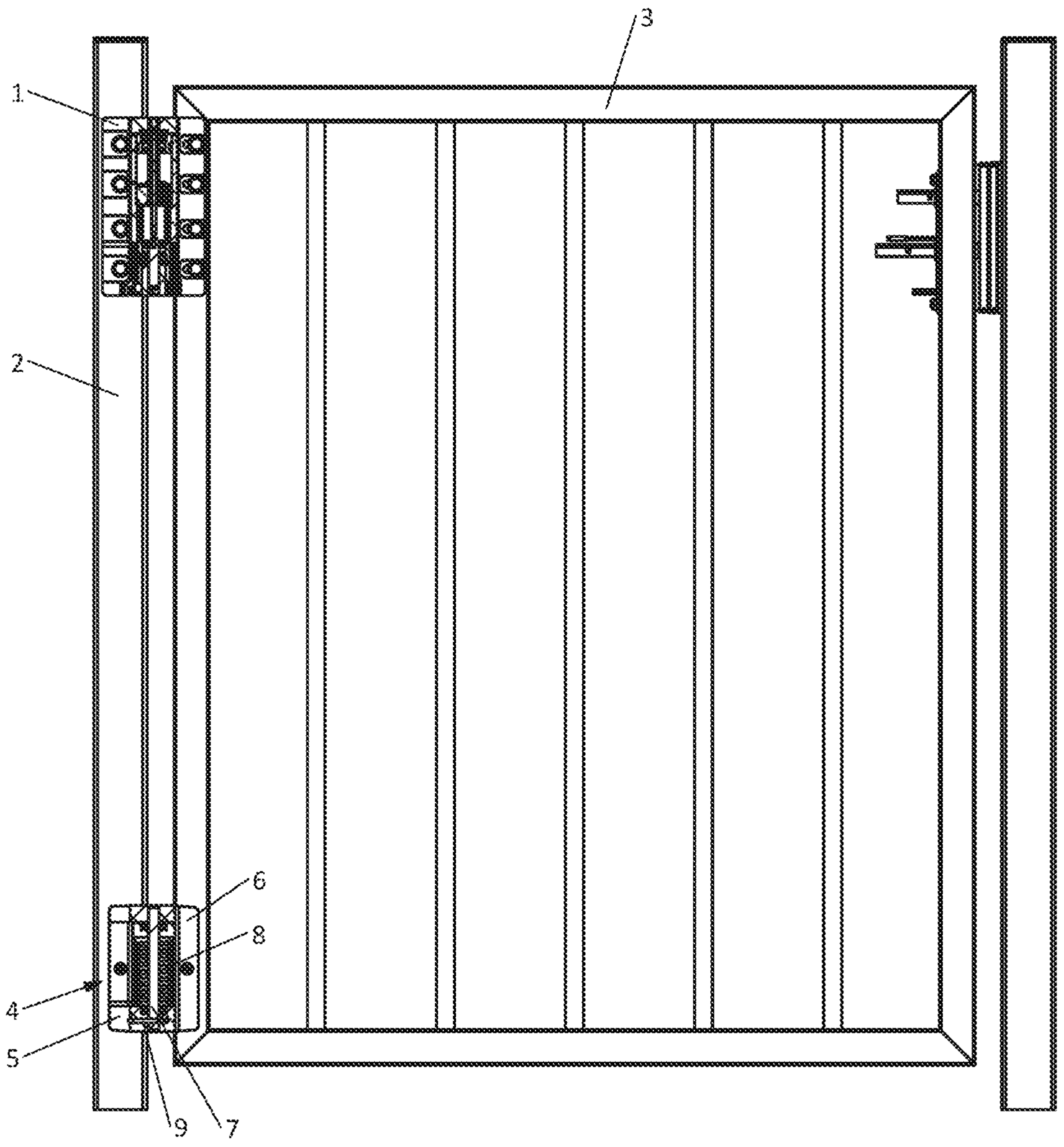

FIGS. 1A and 1B illustrate a left-handed, respectively right-handed, closure system. The same hinge(s) 1, 4 may be used for both kinds of closure systems as the hinge(s) 1, 4 may be mounted in differently oriented positions depending on the handedness of the closure system. Specifically, for a right-handed closure system, the hinge(s) is/are mounted with its/their longitudinal axis in a first orientation (e.g. upright or upside down), while, for a left-handed closure system, the hinge(s) is/are mounted with its/their longitudinal axis in a second orientation that opposite to the first orientation (e.g. upside down or upright). This enables the energy storing mechanism and the dashpot to operate in the same way for both a right-handed closure system and a left-handed closure system and to have the same hinge member always fixed to the same closure member.

The energy storing mechanism will be described with respect to FIGS. 1A and 1B. The hinge 4 generally comprises a first hinge member 5 that is mounted, for both orientations, to the support 2 and a second hinge member 6 that is mounted, for both orientations, to the closure member 3. The hinge members 5, 6 are pivotable with respect to one another and are arranged to form a gate hinge with a central shaft 7 that extends between both hinge members 5, 6 and defines a longitudinal axis. In the illustrated embodiment, the shaft 7 is connected to the first hinge member 5 by a transverse pin 9, but other connection means are possible. A torsion spring 8 is mounted around the shaft 7 and has a first extremity connected to the first hinge member 5 and a second extremity connected to the second hinge member 6. The torsion spring 7 is preferably pre-tensioned during assembly of the hinge 4 in the sense that, irrespective of the relative positions of the hinge members 5, 6, the torsion spring 7 always has a minimum amount of energy stored. This ensures that the closure system will be properly closed.

When opening the closure member 3, the hinge members 5, 6 will rotate relative to one another. As such, also the extremities of the torsion spring 7 are rotated relative to one another is such a way that the spring 7 is wound up, i.e. stores energy. When releasing the closure member 3, the torsion spring 7 will relax causing the hinge members 5, 6 to rotate relative to one a direction opposition to when opening the closure member 3. Thus the closure member 3 will be urged to close.

It will be readily appreciated that other systems are known in order for a closure system to be self-closing. In particular systems relying on a compression, tension, volute or leaf spring may also be used instead of the torsion spring system described above.

Figure 2:
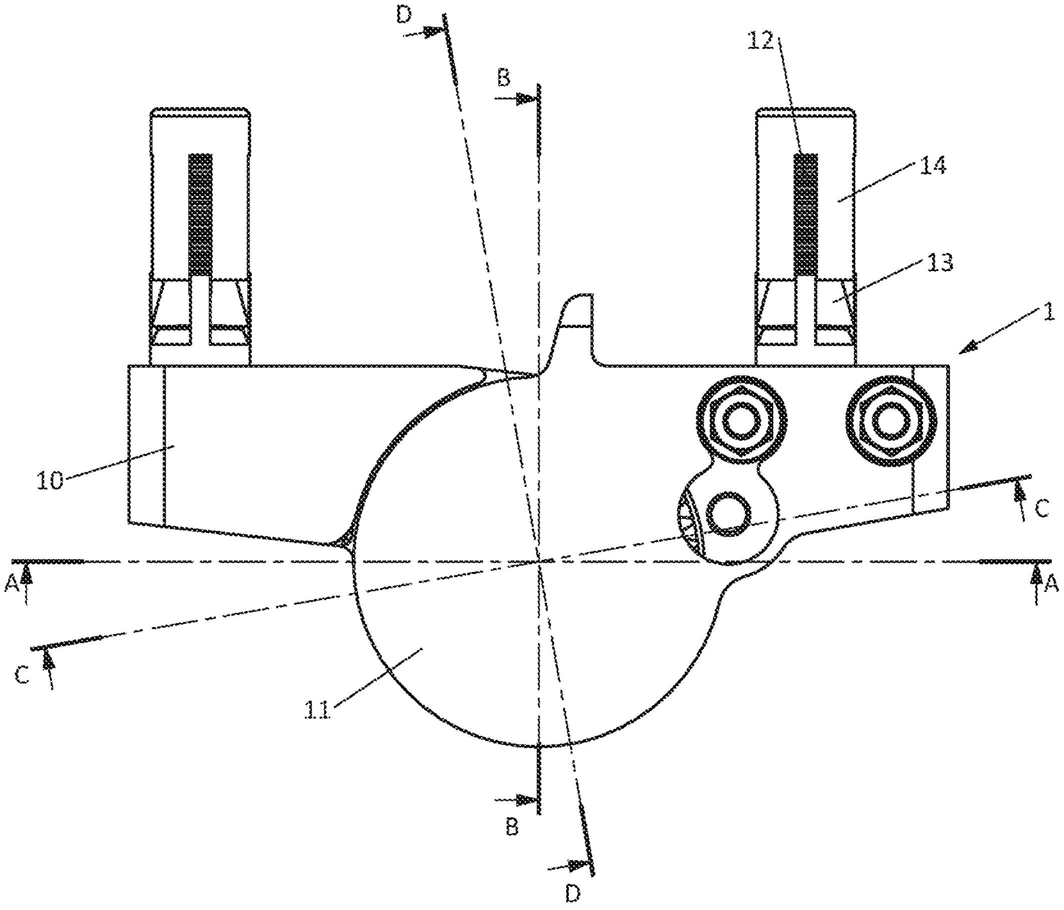
FIG. 2 shows a top view of the hydraulically damped hinge of FIG. 1 in a closed position.

The hydraulically damped hinge 1 will be described in greater detail by reference to FIGS. 2 to 10. A top view of the hydraulically damped hinge 1 is shown in FIG. 2. The hinge 1 comprises a first hinge member 10 that is configured to be fixed to the closure member 3 and a second hinge member 11 which is pivotably mounted to the first hinge member 10 and which is configured to be fixed to the support 2.

In particular, each hinge member 10, 11 is fixed to the closure system using four fixture sets as described in EP 1 907 712 B1 or in EP 3 575 617 A1. In particular, for each fixture set, a bolt 12 is inserted through the hinge member 10, 11 into a fixation element 13 having a square cross-section that fits into a square section 83 (indicated in FIG. 6 for the first hinge member and FIG. 10 for the second hinge member) on the backside of the hinge member 10, 11. For each fixture set, the bolt 12 is screwed into an automatically fastening nut element 14 that is located inside the support 2 or the closure member 3. It will be readily appreciated that more or fewer fixture sets may also be used to fix the hinge members 10, 11 to the closure system. Moreover, other fastening means may also be used.

The internal structure of the hydraulically damped hinge 1 will be described in greater detail by reference to FIGS. 3A to 3D which show longitudinal cross-sections along the planes indicated in FIG. 2.

The hinge 1 is constructed as a gate hinge in the illustrated embodiments. In particular, the first hinge member 10 comprises a leaf 16 and a tubular cylinder barrel 17 having a longitudinal axis 18. The second hinge member 11 comprises a leaf 19 that is connected with a first tubular part 20 and a second tubular part 21. The tubular parts 20, 21 have a shape, in particular diameter and longitudinal axis, corresponding to the tubular cylinder barrel 17 and are located on opposing ends of the tubular cylinder barrel 17. More specifically, the cylinder barrel 17 has a first end 22 (indicated in FIG. 10) adjacent which the first tubular part 20 is positioned and a second end 23 (indicated in FIG. 10) adjacent which the second tubular part 21 is positioned. In other words, the cylinder barrel 17 forms a central knuckle of the hinge 1 while the tubular parts 20, 21 each form an outside knuckle of the hinge 1.

The hinge 1 comprises a shaft 24 that extends along the length of the tubular cylinder barrel 17 and has a rotation axis that substantially coincides with the longitudinal axis 18 of the cylinder barrel 17. The shaft 24 has a first extremity 25 that is connected to the first tubular part 20, in particular by a transverse pin 27. The shaft 24 also has a second extremity 26 that is positioned in a guiding opening 28 (indicated in FIG. 10) in the second tubular part 21.

The mechanical connection between the hinge members 10, 11 is achieved by the use of the shaft 24 and by the use of bearings and bearing surfaces. As illustrated in FIGS. 3A to 3D, a first roller bearing 29, in particular a steel roller bearing, preferably a ball bearing, is provided at the first end 22 of the cylinder barrel 17 and a second roller bearing 30, in particular a steel roller bearing, preferably a ball bearing, is provided at the second end 23 of the cylinder barrel 17. In general, each roller bearing 29, 30 are interposed between the first hinge member 10, in particular the cylinder barrel 17, and a respective tubular part 20, 21 of the second hinge member 11.

Both of the roller bearings 29, 30 have an outer race 31, 32 that radially engages the tubular cylinder barrel 17. More specifically, the outer race 31 directly engages part of an inner wall of the cylinder barrel 17, while the outer race 32 engages a longitudinal surface formed in a sealing cap 33 that is fixed to the cylinder barrel 17 by a transverse pin 34 (indicated in FIGS. 3B and 10). Both of the roller bearings 29, 30 have an inner race 34, 35 that radially engages the shaft 24. These roller bearings 29, 30 enable an almost frictionless relative rotation of the shaft 24 with respect to the tubular cylinder barrel 17.

FIGS. 3A to 3D also illustrate that the outer race 31 of the first roller bearing 29 axially engages a transverse abutment surface formed on the inner wall of the cylinder barrel 17, while the outer race 32 of the second roller bearing 30 axially engages a transverse abutment surface formed on the sealing cap 33. Transverse abutment surfaces are also provided for the inner races 34, 35 of the roller bearings 29, 30. Specifically, the shaft 24 is provided with two grooves 36, 37 (indicated in FIG. 7) into which a fixation ring 38, 39 is placed, which fixation rings 38, 39 form a transverse abutment surface for a respective inner race 34, 35.

Such a configuration may be used to support the weight of the closure member 3 to which the cylinder barrel 17 is fixed. In particular, the force generated by the weight of the closure member 3 is transmitted, by the roller bearings 29, 30, via the outer races 31, 32 to the inner races 34, 35, to the fixation rings 38, 39 securely fixed to the shaft 24. In order for the roller bearings 29, 30 to support such a weight, they should have as large a diameter as possible since a large surface area of the races 31, 32, 34, 35 is preferred to transmit the axial forces.

Figure 6:
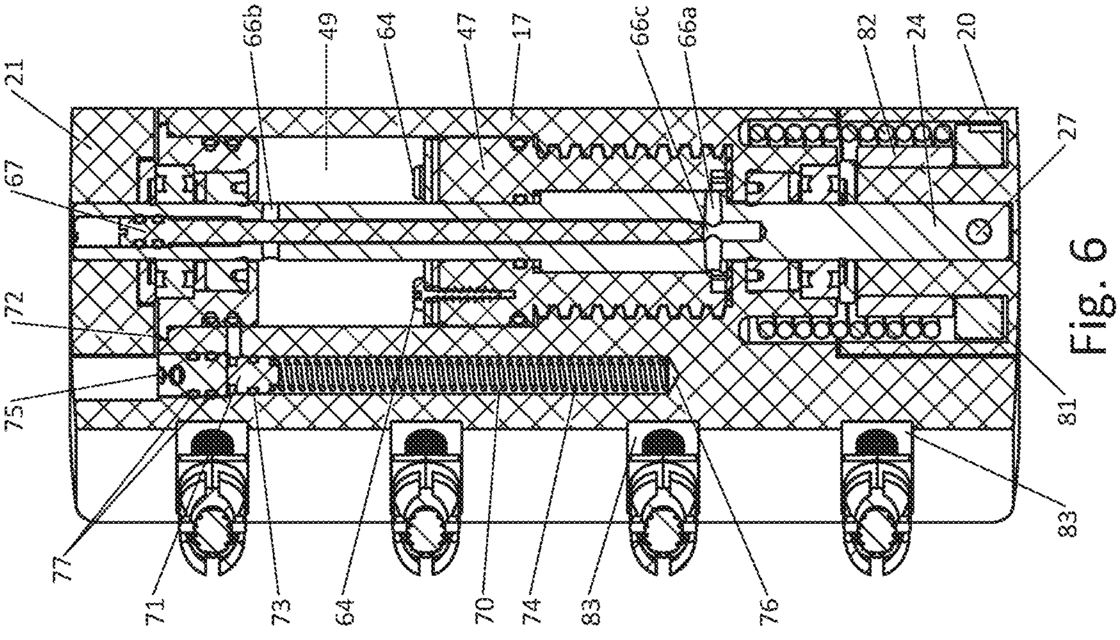
FIG. 6 shows a longitudinal cross-section along plane E in FIG. 5.

However, in the illustrated embodiment, it is preferred to use as compact as possible roller bearings 29, 30 in order to reduce the size of the hinge 1. Moreover, as described below, this allows the provision of one or more additional torsion springs disposed around the roller bearings 29, 30. To compensate for the smaller roller bearings 29, 30, two thrust washers 40, 41 are provided between the cylinder barrel 17 and the tubular parts 20, 21. Specifically, the first thrust washer 40 is interposed between the first tubular part 20 and the cylinder barrel 17 and the second thrust washer 41 is interposed between the second tubular part 21 and the cylinder barrel 17. The thrust washer 40, 41 specifically engage the outer race 34, 35 of a corresponding roller bearing 29, 30. The thrust washers 40, 41 act as the bearing surface for bearing the closure member 3. For example, as illustrated in FIGS. 3A to 3D which show the hinge 1 for a left-handed closure member, the closure member 3 is borne by the second thrust washer 41, while, for a right-handed closure member as illustrated in FIG. 6, the closure member 3 is borne by the first thrust washer 40. The thrust washers 40, 41 are made of a synthetic material which has antifriction properties, i.e. which provides a reduced friction between the thrust washers 40, 41 and the outer races 31, 32 of the roller bearings 29, 30.

FIGS. 3A to 3D further provide details on the hydraulic damping mechanism, i.e. the dashpot. The shaft 24 transfers the opening and closing movement of the closure system to the dashpot and is therefore also referred to as the damper shaft 24.

The dashpot comprises a closed cylinder cavity formed inside the cylinder barrel 17. The closed cylinder cavity is filled with hydraulic fluid and is closed by various seals. Specifically, at the first end 22 of the cylinder barrel 17 a first annular seal 42 is disposed around the damper shaft 24 and engages the inner wall of the cylinder barrel 17. This annular seal 42 prevents leakage of hydraulic fluid that could occur due to the relative rotation of the damper shaft 24 with respect to the cylinder barrel 17. At the second end 23 of the cylinder barrel, the cylinder cavity is closed by the seal cap 33. A second annular seal 43 is disposed around the damper shaft 24 and engages an inner wall of the seal cap 33. This annular seal 43 prevents leakage of hydraulic fluid that could occur due to the relative rotation of the damper shaft 24 with respect to the seal cap 33. In order for the seal cap 33 to be effectively sealed with respect to the cylinder barrel 17, two sealing rings 44 are provided on an outer wall of the seal cap 33.

The annular seals 42, 43 are positioned near the roller bearings 29, 30 with a washer 45, 46 placed between them. These washers 45, 46 ensure that rotation of the roller bearings 29, 30 does not affect the annular seals 42, 43. This avoids friction between the roller bearings 29, 30 and the annular seals 42, 43, which friction could damage the annular seals 42, 43. Furthermore, placing the annular seals 42, 43 near the roller bearings 29, 30, i.e. the locations where radial forces between the damper shaft 24 and the cylinder barrel 17 are minimized, minimizes the chance that the annular seals are deformed or damaged due to such radial forces.

Figure 4:
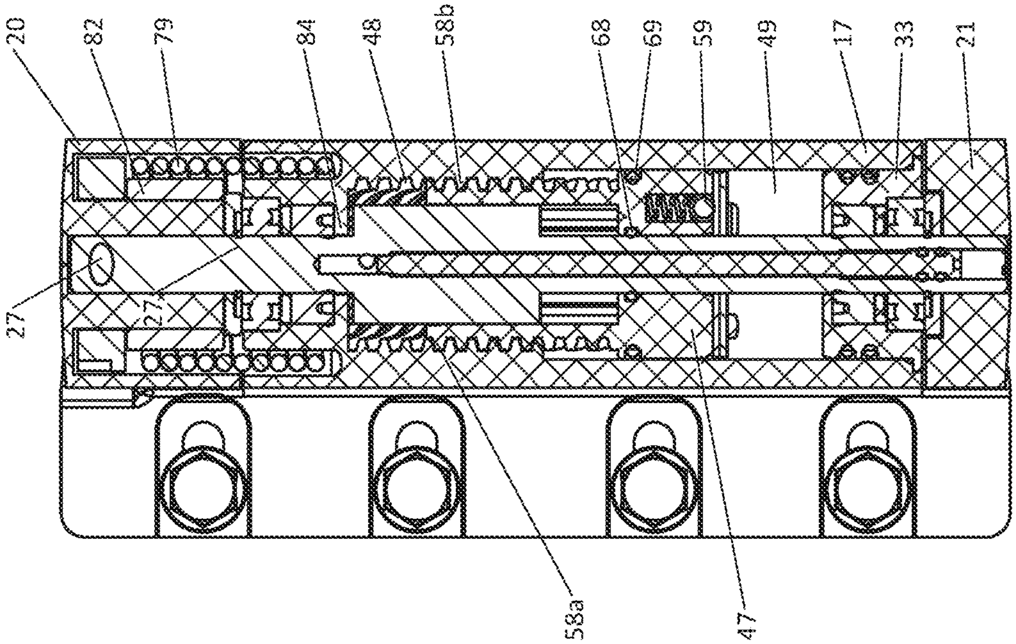
FIG. 4 shows a longitudinal cross-section along plane A in FIG. 2 with the hinge in a 90° opened position.

The dashpot further comprises a piston 47 placed in the closed cylinder cavity to divide the closed cylinder cavity into a high pressure compartment 48 (indicated in FIG. 4 which shows the hinge 1 in a partially opened position with the piston 47 moved away from the collar 84) and a low pressure compartment 49 (indicated in FIG. 4). The dashpot further comprises a motion converting mechanism to convert the relative rotation between the cylinder barrel 17 and said damper shaft 24 into a sliding motion of the piston 47 between two extreme positions.

Figure 7:
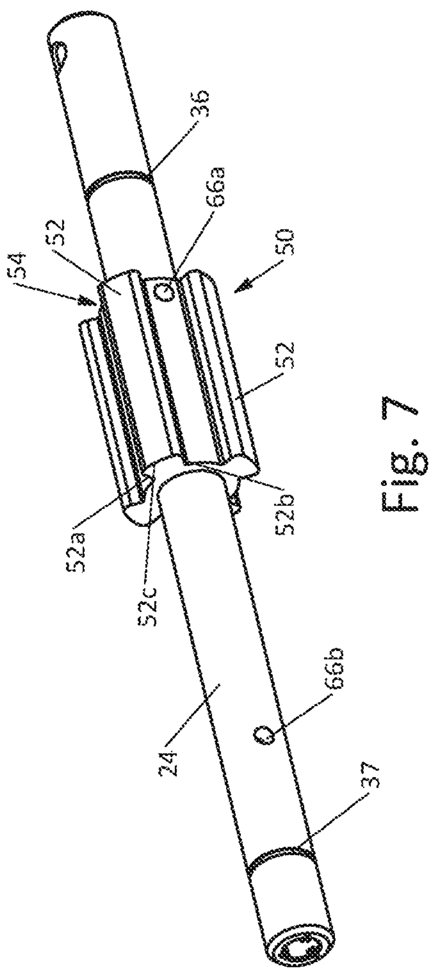
FIG. 7 shows a perspective view of a damper shaft of the hydraulically damped hinge of FIG. 1.
Figure 9A:
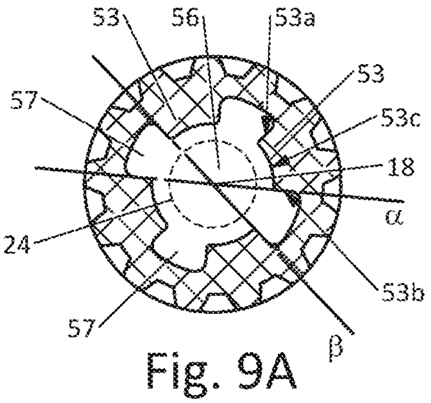
FIGS. 9A and 9B show transverse cross-sections through the piston along planes A and B indicated in FIG. 8.
Figure 8:
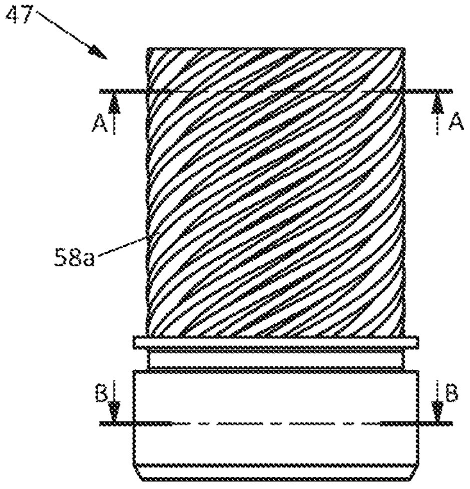
FIG. 8 shows a front side view of a piston of the hydraulically damped hinge of FIG. 1.
Figure 9B:
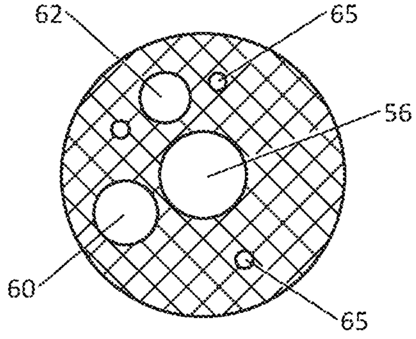

In the illustrated embodiments, the piston 47 is not rotatable with respect to the damper shaft 24. This is achieved by a locking element 50 that is securely fixed to the damper shaft 24. This locking element 50 is best shown in FIG. 7 and is integrally formed with the damper shaft 24. Alternatively, the locking element 50 may be a separate entity fixed to the damper shaft 24. The locking element 50 comprises four ribs 52 that protrude radially outward from the locking element 50, each pair of ribs 52 forms a groove 54 between them. Each rib 52 is formed by two radially extending side faces 52*a*, 52*b* that are joined by a front face 52*c*, which front faces 52*c* preferably partly lie on a hypothetical cylinder surface around the longitudinal direction 18. The piston 47, as shown in FIGS. 9A and 9B, has a central hole 56 having a minimal cross-sectional area (illustrated in FIG. 9B) sufficiently large to accommodate the damper shaft 24. In the region where the piston 47 interlocks with the locking element 50, the central hole 56 has an outer wall that has a shape corresponding to that of the locking element 50, i.e. the outer wall is provided with four grooves 57 that each match one of the ribs 52. Each groove 57 is formed by two adjacent ribs 53, each rib 53 being formed by two radially extending side faces 53*a*, 53*b* that are joined by a front face 53*c* as indicated in FIG. 9A.

As indicated in FIG. 9A, imaginary planes α, β that coincide with each side face 53*a*, 53*b* (which side faces substantially correspond to those of side faces 52*a*, 52*b*) bisect near the longitudinal axis 18 of the damper shaft 24. This causes any rotational force on the piston 47 to be transferred to the locking element 50 in a direction tangential to the rotational movement of the piston thus optimizing the force transfer and avoiding unnecessary, in particular radial, forces act upon the piston 47, which forces could lead to a rapid wear and/or deformation of the piston 47. A smallest angle between the imaginary planes α, β is about 42° in the illustrated embodiment, but other values are possible. It will be readily appreciated to more or fewer ribs 52, 53 and corresponding grooves 57 may also be used or that other shapes and or mechanisms may be used in order to prevent rotation between the piston 47 and the damper shaft 24.

Figure 3B:
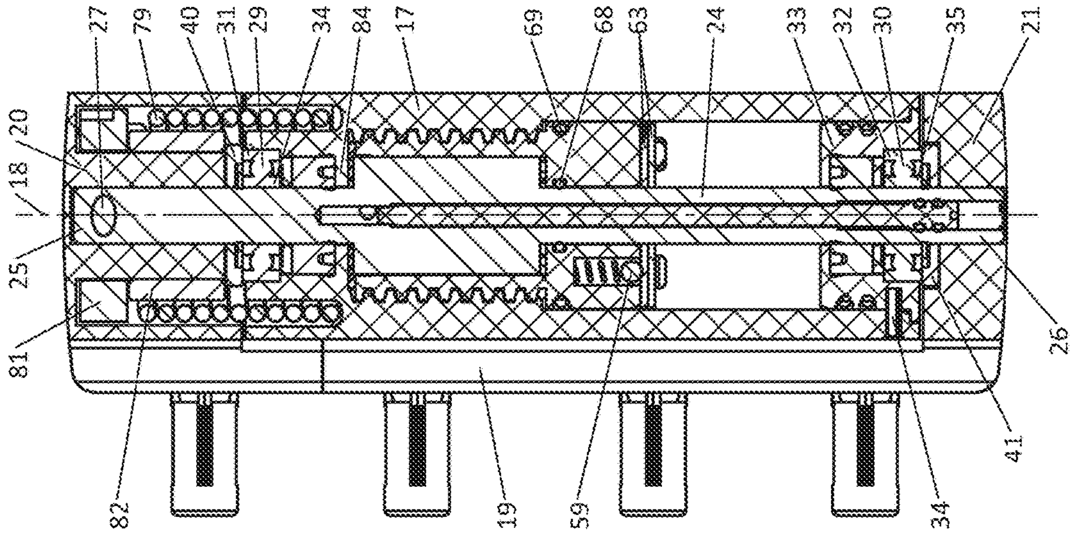
FIGS. 3A to 3D show longitudinal cross-sections through the hydraulically damped hinge along planes A-D indicated in FIG. 2.
Figure 3A:
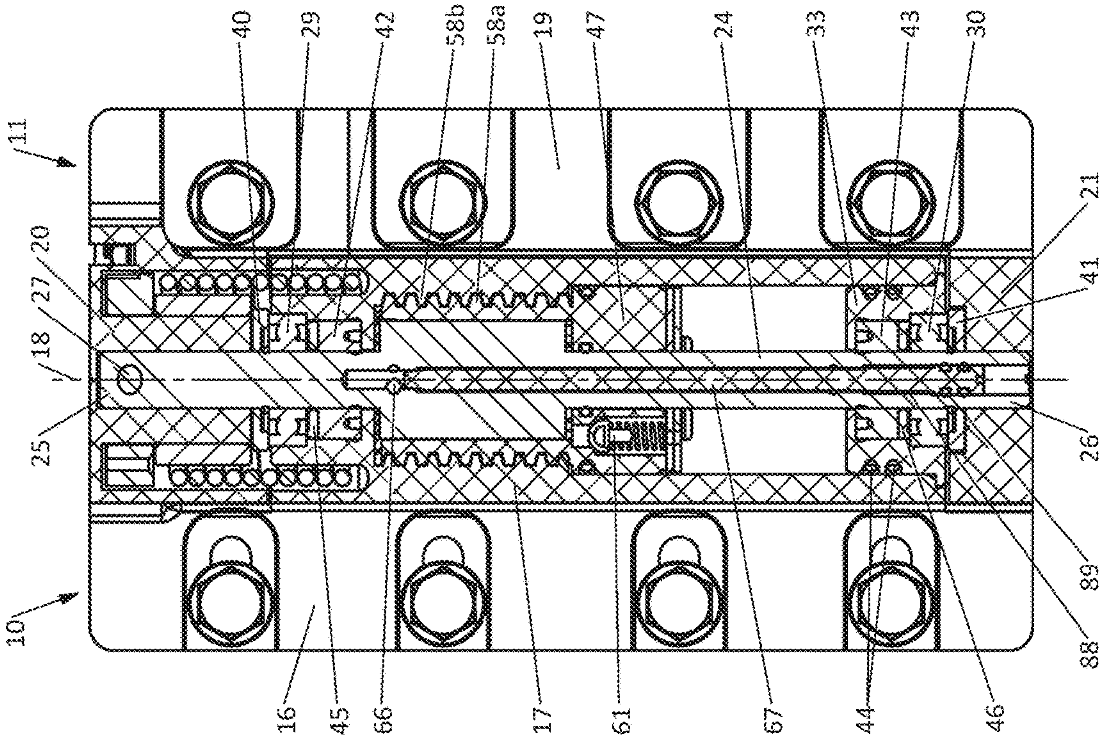
Figure 3D:
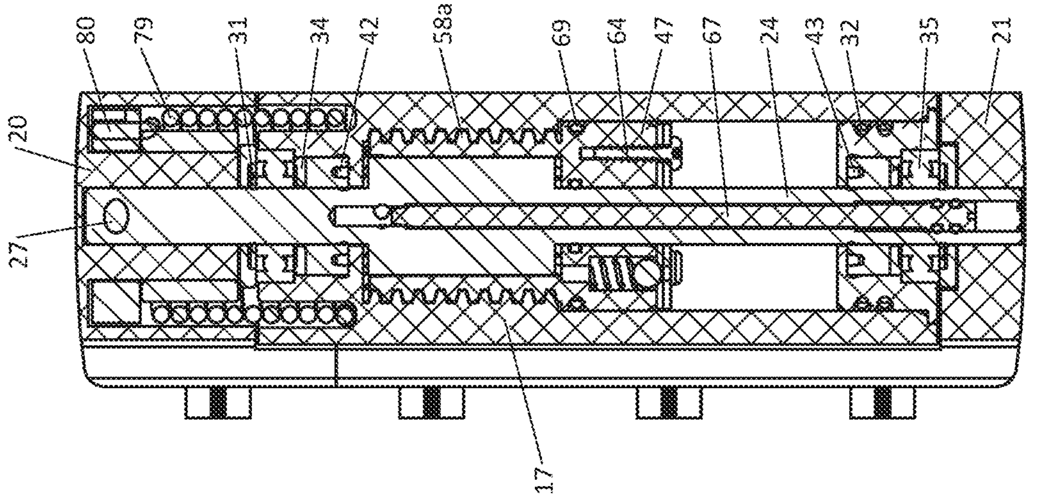
Figure 3C:
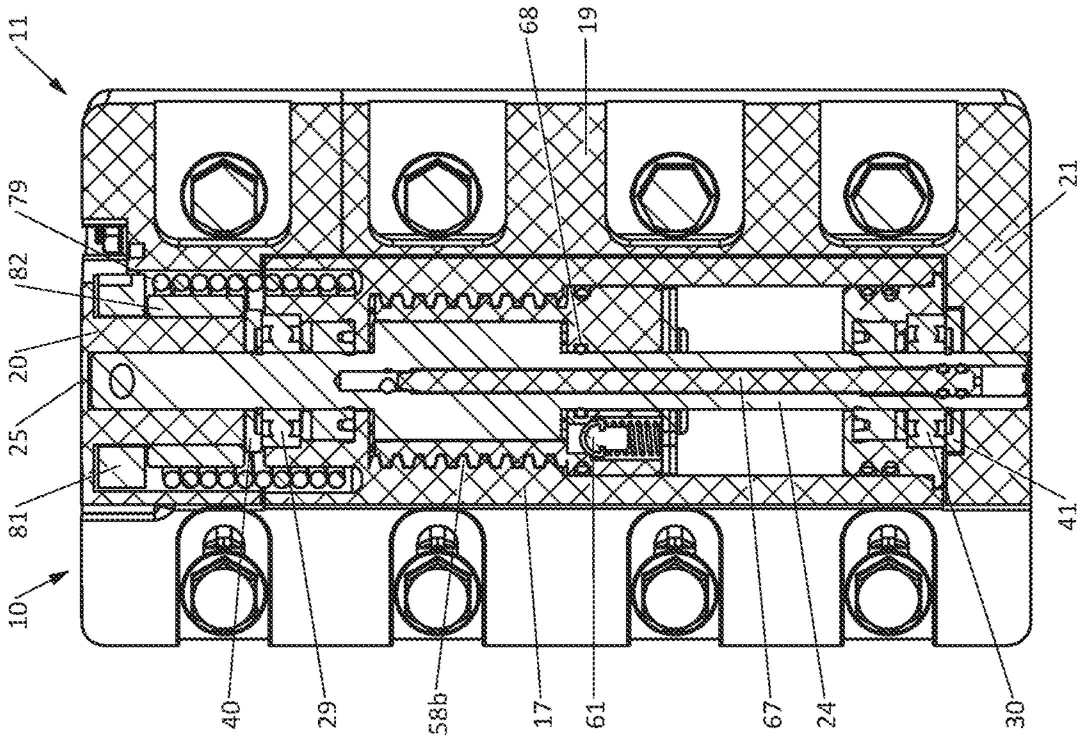

The motion converting mechanism further comprises two mutually co-operating screw threads 58*a*, 58*b* (indicated in FIG. 3A). A first (male) screw thread 58*a* is provided on the outer surface of the piston 47 and a second (female) screw thread 58*b* is provided on the inner wall of the cylinder barrel 17. The screw threads 58*a*, 58*b* have a screw axis which substantially coincides with the longitudinal axis 18. When the piston 47 is rotated in the closed cylinder cavity, the piston 47 does not only rotate but also slides with respect to the closed cylinder cavity. In particular, the piston 47 moves towards the seal cap 33 (i.e. the low pressure compartment 49 is reducing in volume as hydraulic fluid flows towards the high pressure compartment 48) when the closure system is being opened and it moves away from the seal cap 33 (i.e. the high pressure compartment 48 is reducing in volume as hydraulic fluid flows towards the low pressure compartment 49) when the closure system is being closed. In the illustrated embodiments, the screw threads 58*a*, 58*b* are therefore right-handed screw threads.

To keep the hinge 1 as compact as possible, no gearing or reduction is provided between the cylinder barrel 17 and the damper shaft 24. As such, the screw threads 58*a*, 58*b* have a high helix angle. Preferably, the first screw thread 58*a* has a helix angle of at least 15°, preferably at least 20° and more preferably at least 25°. In the illustrated embodiment, the helix angle is equal to about 28°. Moreover, the first screw thread 58*a* has at least 5 starts, preferably at least 8 starts and more preferably at least 10 starts. In the illustrated embodiment, the first screw thread 58*a* has 13 starts. By placing the first screw thread 58*a* on the outside of the piston 47, the diameter of the screw thread 58*a* is increased, thereby increasing its lead at the same helix angle or maintaining the same lead at a lower helix angle. The first screw thread 58*a* preferably has a lead of at least 30 mm, preferably at least 40 mm and more preferably at least 50 mm. In the illustrated embodiment, the first screw thread 58*a* has a lead of 60 mm. The outer diameter of the first screw thread 58 is equal to 36 mm. The lead of 60 mm is obtained with a helix angle of about 28°.

The dashpot further comprises a one-way valve 59 (indicated in FIGS. 3B and 3D) which allows the hydraulic fluid to flow from the low pressure compartment 49 of the closed cylinder cavity to the high pressure compartment 48 thereof when the closure system is being opened. The opening movement of the closure system is therefore not damped or at least to a smaller extent than the closing movement. This one-way valve 59 is typically provided in the piston 47, in particular in a fluid passage 60 (indicated in FIG. 9B) through the piston 47. The one-way valve 59 is executed as a spring-biased check valve where a spring member biases a ball (or ball-shaped member) to close of the fluid passage 60.

The piston 47 is also provided with a further one-way valve, namely a safety valve 61 (indicated in FIG. 3A), which enables flow of hydraulic fluid in the opposite direction (i.e. from the high pressure compartment 48 to the low pressure compartment 49) but only in case the pressure in the high pressure compartment 48 of the cylinder cavity would exceed a predetermined threshold value, for example when an external closing force would be exerted onto the closure member 3 which could damage the hinge 1. The spring provided in this safety valve 61 has thus a much larger spring constant than the spring provided in the one-way valve 59 as the safety valve 61 should not be opened under normal operating conditions. This one-way valve 61 is typically provided in the piston 47, in particular in a fluid passage 62 (indicated in FIG. 9B) through the piston 47. The one-way valve 61 is executed as a spring-biased check valve where a spring member biases a ball (or ball-shaped member) to close of the fluid passage 62.

As shown in FIGS. 3A to 3D, one or more mounting plates 63 are attached to the bottom of the piston 47. These plates 63 may be attached by means of one or more screws 64 (indicated in FIG. 6) that fit into corresponding holes 65 (indicated in FIG. 9B) in the piston 47.

To achieve the damping action upon closing of the closure system, a restricted fluid passage 66 is provided between the compartments 48, 49 of the closed cylinder cavity. The restricted fluid passage 66 is best shown in FIG. 6 and connects, in all the possible positions of the piston 47, i.e. in all positions between its two extreme positions, the low pressure compartment 49 with the high pressure compartment 48. In the illustrated embodiment, the passage 66 is provided in the damper shaft 24 and is formed by two transverse bores 66*a*, 66*b* connected by an axial bore 66*c*. The minimal cross-section of the passage 66 determines the closing speed of the closure member 3. It will be appreciated that the restricted fluid passage may also be provided in the wall of the cylinder barrel 17. However, providing this passage in the damper shaft 24 is advantageous when an adjustable valve is desired to regulate the closing speed.

In the illustrated embodiment, an adjustable valve 67, in particular a needle valve, is placed in the axial bore 66*c*. The narrowest cross-section within the restricted fluid passage 66 is formed between the top part of the adjustable valve 67 and the bore 66*c*. The adjustable valve 67 is screwed by means of a screw thread 88 at its proximal end, i.e. at its end which is accessible from the outside to rotate the valve 67, into the extension of the axial bore 66*c* that runs to the second extremity of the damper shaft 24, which extremity is left accessible from outside due to the hole 28 in the second tubular part 21. Two annular seals 89 are provided at the proximal end of the adjustable valve 67 between the valve 67 and the axial bore 66*c* to prevent leakage of hydraulic liquid out of the cylinder cavity. The valve 67 may be rotated when the hinge 1 is mounted, which rotation causes the top of the valve 67 to move upwards or downwards thereby changing the narrowest cross-section within the restricted fluid passage 66, i.e. adjusting the closing speed of the closure member 3. The top of the valve 67 typically has an inclined outer surface while the bore 66*c* has a stepped diameter such that an upwards or downwards movement of the valve 67 causes the inclined outer surface to be displaced with respect to the stepped diameter part of the bore 66*c* thereby changing the narrowest cross-section within the restricted fluid passage 66. It will be readily appreciated that the hinge 1 may also be provided without an adjustable valve 67 in which case the closing speed of the closure member 3 is fixed.

In a non-illustrated embodiment, a second restricted fluid passage (optionally with a second adjustable valve) may be provided between the compartments 48, 49 of the closed cylinder cavity as described in WO 2018/228729 A1. This second restricted fluid passage forms a by-pass which causes an increase of the closing speed at the end of the closing movement, i.e. a final snap, to ensure that the closure system is reliably closed.

The dashpot also comprises a two sealing rings 68, 69 (indicated in FIG. 4) to seal the high pressure compartment 48 from the low pressure compartment 49. A first sealing ring 68 is being provided on an inner surface of the piston 47 in contact with the damper shaft 24 and a second sealing ring 69 is provided on an outer surface of the piston 47 in contact with the inner wall of the cylinder barrel 17. Providing these sealing rings 68, 69 ensures that the restricted fluid passage 66 is only formed within the damper shaft 24 such that controlling the hydraulic fluid flow is more efficient as all of the displaced hydraulic fluid has to pass through the restricted fluid passage.

The hinge 1 described above is mainly used outdoors where large temperature variations are not uncommon. For example, summer temperatures up to 70° C. when the actuator 100 is exposed to direct sunshine and winter temperatures below −30° C. are not uncommon, i.e. temperature variations up to and possibly even exceeding 100° C. are possible. Moreover, there are also daily temperature variations between night and day which can easily exceed 30° C. when the hinge 1 is subjected to direct sunshine. These temperature variations cause expansion, and also contraction, of the hydraulic fluid, which could affect the operation of the dashpot. In particular, the expansion due to temperature variations can be up to 1% of the volume of hydraulic fluid for a temperature variation of 10° C., depending on the expansion coefficient of the hydraulic fluid. As such, an expansion of, for example, up to 3 ml for a temperature difference of 50° C. is possible.

To counter this expansion, a small amount of gas such as air could be provided in the hydraulic fluid itself. However, it has been found that this gas may interfere with the good working of the hinge 1, especially when gas bubbles, or an emulsion of the gas in the hydraulic fluid, passes through the restricted flow passage(s) and provides a smaller damping effect than pure hydraulic fluid. Consequently, the hydraulic fluid is preferably free of gas bubbles.

Figure 5:
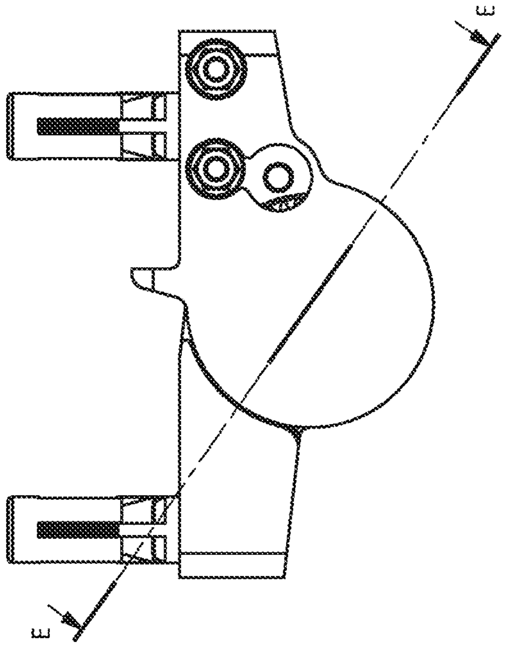
FIG. 5 shows a top view of the hydraulically damped hinge of FIG. 1 in its right-handed orientation.

In the hinge 1 illustrated in the drawings, expansion of the hydraulic fluid is countered by means of an expansion channel 70 provided in a bore in the tubular cylinder barrel 17 as illustrated in FIG. 6 which shows a longitudinal cross-section along plane E in FIG. 5. The expansion channel 70 has a moveable plunger 71 inserted therein. The plunger 71 divides the expansion channel 70 into a hydraulic fluid compartment having a first volume that is in fluid communication with the closed cylinder cavity via a channel 72 and a pressure relief compartment 76 having a second volume. The plunger 71 has a ring-shaped seal 73 on its outside to prevent leaks between the hydraulic fluid and the pressure relief compartments. It will be readily appreciated that multiple ring-shaped seals may also be provided. When the hinge 1 is exposed to a temperature increase, the volume of the hydraulic fluid increases pushing the plunger 71 deeper into the expansion channel 70 and when the volume of the hydraulic fluid decreases, the plunger 71 is sucked back thereby closing the expansion channel 70.

As illustrated in FIG. 6, the hydraulic fluid compartment is in fluid communication with the low pressure compartment 49 of the closed cylinder cavity. As such, the plunger 71 is not exposed to the high pressures that result from the normal operation of the dashpot. This is advantageous as, exposing the hydraulic fluid compartment to the high pressure compartment would affect the closing movement of the closure system, i.e. the hydraulic fluid would not only flow via the channel but would also enter the hydraulic fluid compartment of the expansion channel 70 by displacing the plunger 71.

In the illustrated embodiment, the pressure relief compartment is also provided with a biasing member formed by a compression spring 74 that urges the plunger 71 towards the channel 72 and an end cap 75 that seals off the expansion channel 70 from the outside. The effect of this spring 74 is that the hydraulic fluid is pressurised so that negative pressures in the hydraulic fluid are alleviated. Specifically, the hydraulic fluid is usually added at room temperature, e.g. near 20° C. When the hinge 1 is exposed to temperatures down to −30° C. a negative pressure would occur in the hydraulic fluid in the absence of the compression spring 74. Furthermore, when the hinge 1 is first exposed to temperatures up to 70° C., and then cooled down to a lower temperature, the increased friction between the ring-shaped seal 73 and the expansion channel 70 (as a result of the fact that the seal 73 becomes less flexible at lower temperatures) could result, in absence of the compression spring 74, in an additional negative pressure in the hydraulic fluid which could result in air getting sucked into the closed cylinder cavity. This problem is solved by the compression spring 74 which pressurizes the hydraulic fluid, even at low temperatures, so that any risk of air being sucked into the cylinder cavity being avoided.

In the illustrated embodiments, the pressure relief compartment 76 is formed by a bore in the cylinder barrel 17. The hydraulic fluid compartment of the expansion channel 70 is closed off by the end cap 75. The end cap 75 is provided with one or more sealing rings 77 on its outside to prevent leakage of hydraulic fluid. The end cap 75 is fixed to the cylinder barrel 17 by a transverse pin 78 (indicated in FIG. 10).

The volume of the expansion channel 70 and its first and second volume is mainly determined in function of the expected increase in volume of the hydraulic fluid. In the illustrated embodiments, the first volume is preferably at least 1.5 ml, more preferably at least 2 ml, advantageously at least 2.5 ml and more advantageously at least 3 ml when the plunger 71 is pushed as far back as possible into the expansion channel 70, i.e. when the first volume is maximal. The maximal second volume is preferably substantially the same as the maximal first volume to provide enough space for the compression spring 74.

The illustrated hinge 1 is also provided with a torsion spring 79 that is interposed between the hinge members 10, 11, in particular between the cylinder barrel 17 and the first tubular part 20. The torsion spring 79 has a first extremity 80 (indicated in FIG. 10) that is fixed to the first tubular part 20, in particular to an annular fixation member 81 through which the transverse pin 27 is placed. The second extremity (not shown) of the torsion spring 79 is placed in a hole (not shown) in the cylinder barrel 17. In particular, the torsion spring 79 is positioned around the first roller bearing 29 thereby providing a hinge 1 that has a reduced height as to when the torsion spring 79 would have to be mounted wholly above the first roller bearing 29. Padding 82 is provided to prevent the torsion spring 79 from buckling due to the large forces exerted thereon.

In the illustrated embodiments, the torsion spring 79 acts together with the torsion spring 8 in the lower hinge 4 to form the energy storing mechanism that causes the set of hinges 1, 4 to be self-closing. The advantage of torsion spring 79 is that it alleviates torque effects caused by providing a closing force at the bottom of the closure member 3 (due to hinge 4) while resisting this closing force at the top of the closure member 3 (due to hinge 1). It will be appreciated that the torsion spring 79 may also be replaced by other kinds of springs, such as a compression, tension, volute or leaf spring. In a non-illustrated embodiment, the hinge 1 is also provided with a torsion (or other kind) of spring between the cylinder barrel 17 and the second tubular part 21 which may lead to a better operation of the hinge 1.

It will be readily appreciated that the torsion spring 79, and the hinge 1, could be made larger to provide a self-closing hydraulically damped hinge without requiring any kind of energy storing mechanism in the lower hinge 4.

Figure 10:
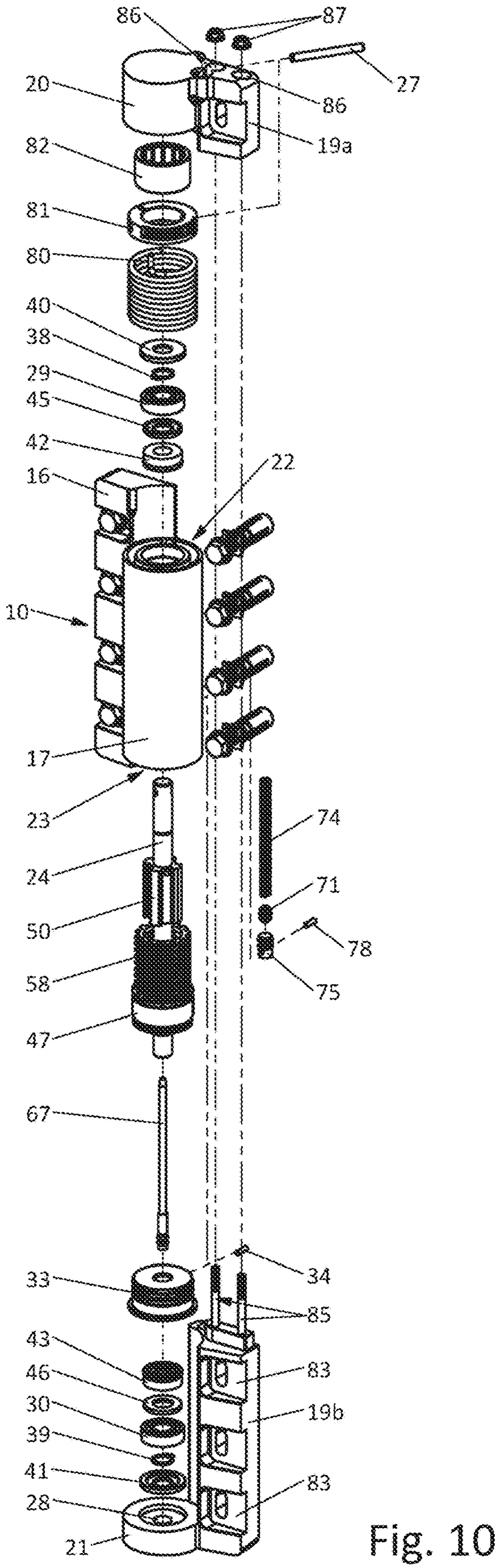
FIG. 10 shows an exploded view of the hydraulically damped hinge of FIG. 1.

FIG. 10 shows an exploded view of the hydraulically damped hinge 1 and is used to describe how to assemble the hinge. Within the cylinder barrel 17, there is a collar 84 (indicated in FIG. 3B). All components below the cylinder barrel 17 in FIG. 10 may be sequentially inserted into the cylinder barrel, likewise for the components above the cylinder barrel 17 in FIG. 10. After positioning all components, the first tubular part 20 with the first part of the leaf 19*a* and the second tubular part 21 with the second part of the leaf 19*b* are placed. The leaf parts 19*a*, 19*b* may then be connected to one another via screw pins 85 provided on the second leaf part 19*b* that fit into corresponding openings 86 in the first leaf part 19*a* and using bolts 87 to secure the part 19*a*, 19*b*. At this stage, it is also possible to pre-tension the torsion spring 79 by rotating the annular fixation member 81 and placing it in the tensioned position of the torsion spring 79 in the tubular part 20 of the leaf part 19*a*.

The hinge members 10, 11 are made from a synthetic material, i.e. they are plastic hinge members 10, 11. As the hinge 1 is meant for outdoor use, the hinge members 10, 11 are continuously exposed to the outside environment during their entire lifetime. It is preferred to use a fibre-reinforced synthetic material to fabricate the hinges in order to provide the required mechanical properties. Polyamide 6 with 40% glass fibres is a composition that is known for its high rigidity and strength and its suitability for continuous exposure applications. However, it will be readily appreciated that other polyamide materials may be used with a different kind of fibres and with a different percentage of fibres, e.g. between 20% and 60% and preferably between 30% and 50% by volume of fibres.

In the illustrated embodiments, the damper shaft 24 is made, preferably extruded, from a metal, preferably aluminium. A metal damper shaft 24 is preferred as it is economically often cheaper to obtain the required strength in a compact damper shaft using metal. Having the damper shaft 24 as compact as possible is beneficial as this leaves more volume to provide hydraulic fluid within a same outside diameter hinge and to keep the front surface of the piston 47 as large as possible. In other words, the maximal volume of the closed cylinder cavity is increased by reducing the diameter of the damper shaft 24. However, the damper shaft 24 should have sufficiently large diameter to handle the forces during operation of the hinge 1. In an embodiment, the ratio of the outside diameter of the damper shaft 24 to the inside diameter of the cylinder barrel 17 is between 0.1 and 0.4; preferably between 0.2 and 0.35; and more preferably between 0.3 and 0.32. This diameter ratio is best determined at the location of the sealing rings 68, 69 as both the piston 47 and the damper shaft 24 necessarily have a circular cross-section at this location.

In the illustrated embodiments, the seal cap 33 is made from a metal, in particular aluminium. It has been found to be easier to provide the roller bearing 30 in a metal element (i.e. the seal cap 33) instead of in a plastic element. In particular, it is difficult to properly tension the roller bearing in a plastic housing. Furthermore, the annular seal 43 is also advantageously positioned in a metal element. Specifically, if the annular seal 43 would be placed in a plastic element, the expansion of the synthetic material could damage the annular seal, in particular the expansion may cause the seal 43 to rotate together with the seal cap, which rotation could damage the seal 43.

Temperature changes will affect the viscosity of the hydraulic fluid in such a way that the damping force decreases as temperature increases. This is a particular problem for outdoor applications where the hinge may be subject to large temperature variations. For example, summer temperatures up to 70° C. when the hinge is exposed to sunlight and winter temperatures below −30° C. are not uncommon, i.e. temperature variations up to and possibly even exceeding 100° C. are possible.

It is preferred to include a compensation mechanism in order to counter changes in hydraulic fluid viscosity. This is achieved by the adjustable valve 67 placed in the restricted fluid passage 66 and fixed thereto only at its proximal end, i.e. at its end which is accessible from the outside, by means of the screw thread 88. More specifically, the adjustable valve 67 is made from a material having a higher thermal expansion coefficient when compared to the damper shaft 24 in which the restricted fluid passage 66 is formed. The difference in thermal expansion coefficients causes the axial clearance between the inclined surface of the valve 67 and the stepped diameter part of the bore 66*c* to decrease with increasing temperature and vice versa, which axial clearance may be the smallest cross-section of the restricted fluid passage 66 depending on the setting of the adjustable valve 67. The adjustable valve 67 may be made from polyethylene or polypropylene as these materials have a higher thermal expansion coefficient and are easy to use in an injection moulding process to manufacture the valve 67. However, other materials may be used which have a higher thermal expansion when compared to the damper shaft 24.

It will be readily appreciated that any differences in thermal expansion coefficient between the piston 47 and the cylinder barrel 17 are inconsequential as the sealing ring 69 will counteract any difference in expansion. Likewise, any differences in thermal expansion coefficient between the piston 47 and the damper shaft 24 are inconsequential as the sealing ring 68 will counteract any difference in expansion.

The piston 47 may be made from a variety of materials, including metals or synthetic materials. Synthetic materials, in particular thermoplastic materials, are preferred as these enable to cost-efficiently fabricate the piston 47 using injection moulding. A preferred thermoplastic material is polyoxymethylene (POM) as this has a low friction thus reducing friction losses between the screw threads 58*a* and 58*b*.

The sealing rings 68, 69 may likewise be made from a variety of materials. Synthetic materials, in particular elastomeric materials such as polyurethane or rubber may be used to fabricate the sealing rings 68, 69. Preferred materials reduce the friction between the sealing rings and the cylinder barrel and the damper shaft.

FIGS. 11 to 15 illustrate a second embodiment of a hydraulically damped hinge 101 for damping a closing movement of a closure member, the hinge 101 including a second embodiment of a dashpot according to the present invention. Elements or components previously described with reference to FIGS. 1 to 10 bear the same last two digits but preceded with number ' 1' and will not necessarily be described again.

Figure 11B:
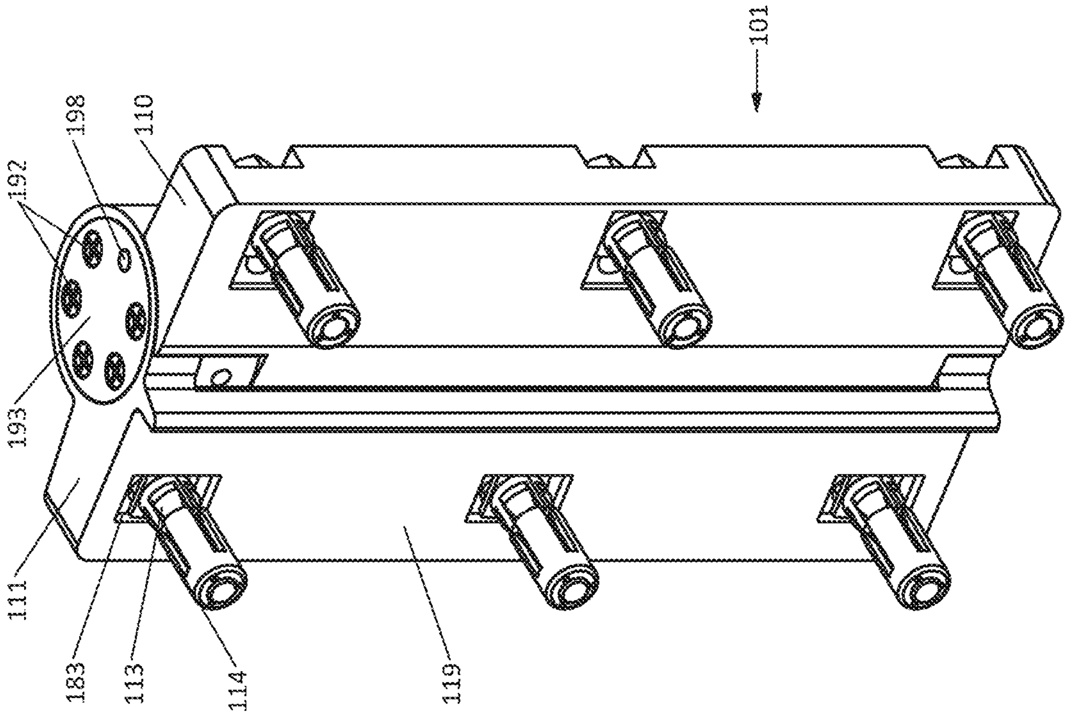
FIGS. 11A and 11B show a perspective view of a second embodiment of a hydraulically damped hinge according to the present invention in its closed position.
Figure 11A:
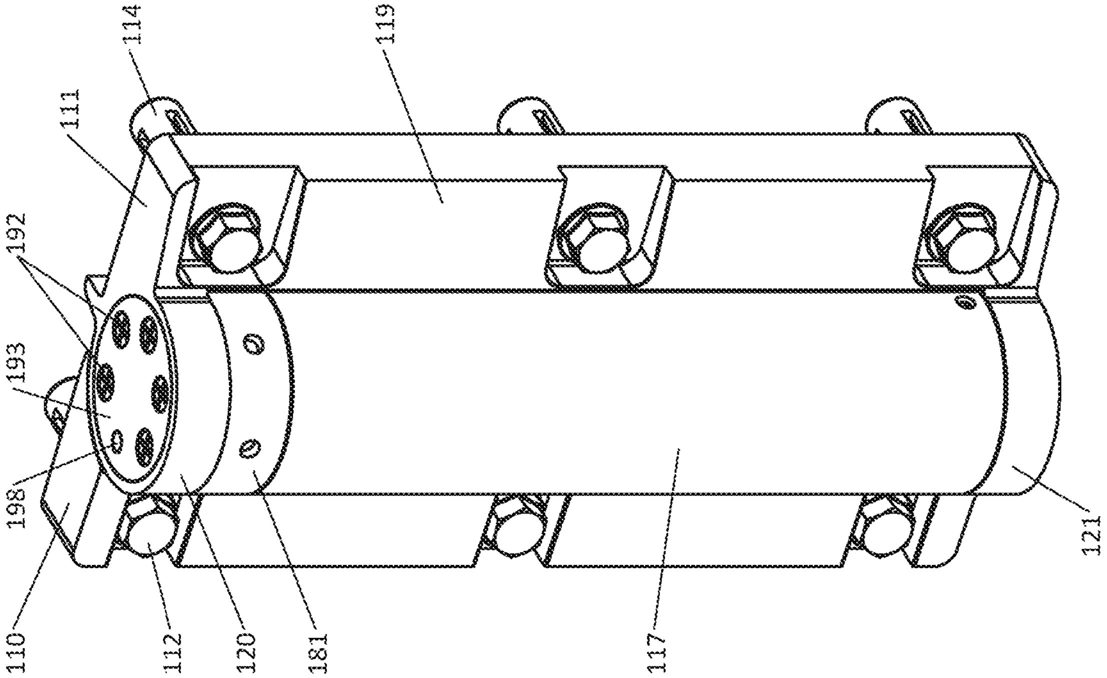

Perspective views of the hinge 101 are shown in FIGS. 11A and 11B. The main differences between the hinge 101 and the hinge 1 is that the hinge 101 only has a single roller bearing disposed around the damper shaft 124 and that the one-way valves are positioned mostly between the screw threads of the piston which causes a reduction in height of the hinge 101 of about 60 mm. In turn this enables the provision of a larger torsion spring 179 such that no torsion spring 8 is needed in a further hinge 4 while still having a self-closing hinge.

Figure 12:
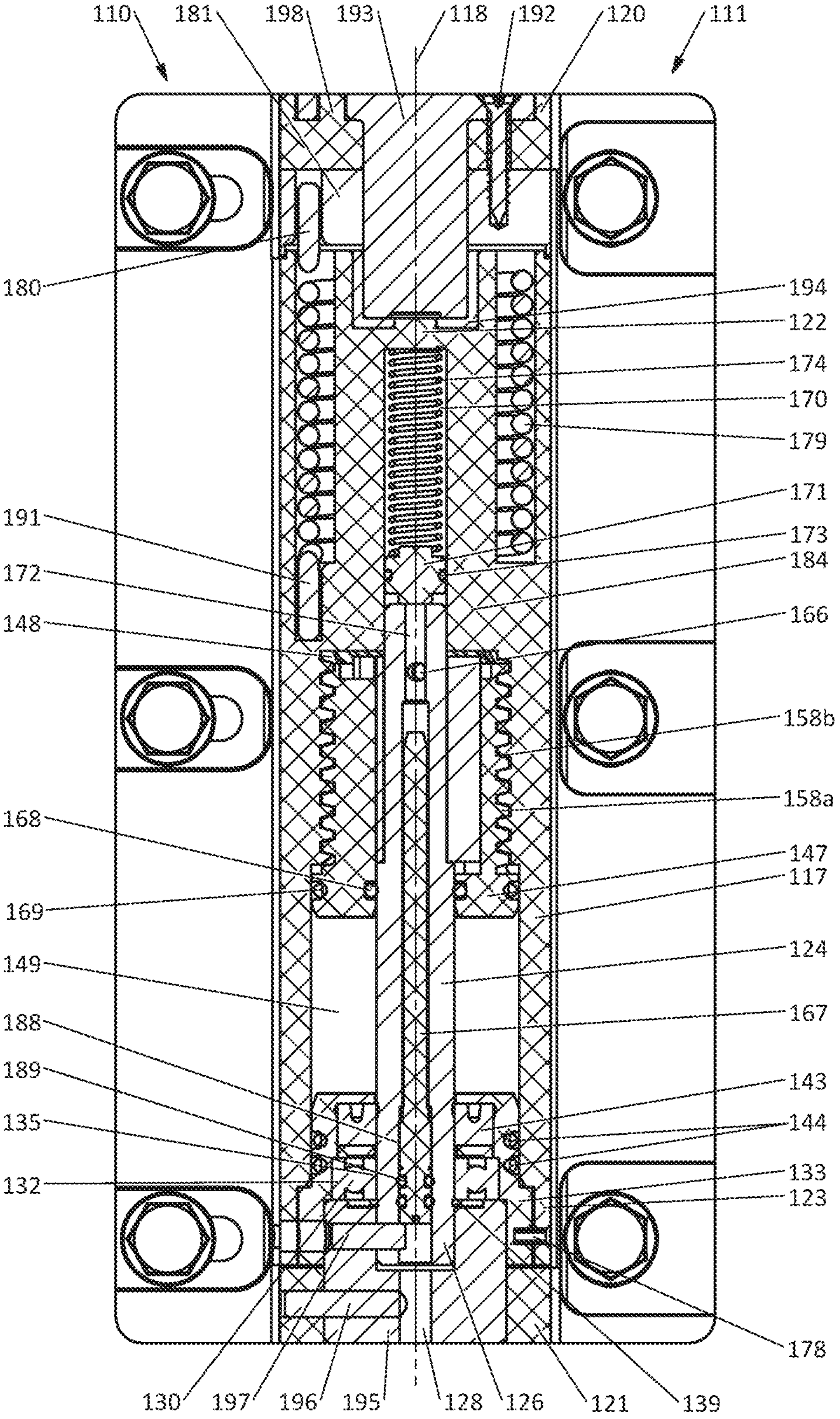
FIG. 12 shows a longitudinal cross-section through the hydraulically damped hinge of FIG. 11.

The construction and assembly of the hinge 101 will be described by reference to FIGS. 12 and 15. The hinge 101 is also constructed as a gate hinge with the cylinder barrel 117 forming a central knuckle surrounded by tubular parts 120, 121 fixed to the second hinge member 111, which, contrary to hinge 1, is now made as an integral part.

The construction near the first tubular part 120 will be described first. The first end 122 of the cylinder barrel 117 is completely closed off and is provided with a recess 199 into which part of a first solid insert 193 is positioned. An annular fixation member 181 is positioned directly on top of the first end 122 of the cylinder barrel 117. A torsion spring 179 is fixed with one extremity 180 to the annular fixation member 181 and with the other extremity 191 to the cylinder barrel 117. The annular fixation member 181 is interposed between the cylinder barrel 117 and the first tubular part 120 of the second hinge member 111. The first solid insert 193 is fixed (by screws 192—alignment between the screw openings in the first solid insert 193 and the first tubular part 120 are obtained by a pin 198 that projects from the tubular part 120 into an opening provided on the solid insert 193) to both the annular fixation member 181 and the first tubular part 120 of the second hinge member 111 such that the first extremity 180 of the torsion spring 179 is fixed to the second hinge member 111 and the second extremity 191 of the torsion spring 179 is fixed to the first hinge member 110. Due to this construction, in the upside-down orientation of the hinge 101, the cylinder barrel 117 rests on the first solid insert 193. In the illustrated embodiment, an antifriction cup 194 is interposed between the cylinder barrel 117 and the solid insert 193 to lessen the friction between these elements during operation of the hinge 101.

The construction near the second tubular part 121 will be described second. The second extremity 126 of the damper shaft 124 (which extremity 126 extends from the second end 123 of the damper shaft 124) is fixed to a solid insert 195 by a transverse pin 197. The solid insert 195 is in turn fixed to the second tubular part 121 by a transverse pin 196. As such, the damper shaft 124 is attached at is second end 126 to the second hinge member 111. The roller bearing 130, in particular the outer race 132 thereof, rests on the solid insert 195. In other words, in the upstanding orientation of the hinge 101 shown in the figures, the outer race 132 acts to transfer longitudinal forces from the cylinder barrel 117 (i.e. the first hinge member 110) to the second hinge member 111. Two transverse pins 196, 197 are used with one of them (i.e. pin 196) being offset with respect to the longitudinal axis 118 to ensure that the opening 128 remains available in order to rotate the adjustable valve 167. It will be readily appreciated that the transverse pins 196, 197 may be substituted by other fixation means.

Both the cup 194 and the roller bearing 130 or at least the outer race 135 thereof are made from steel, in particular stainless steel, as this has a low friction coefficient and a high rigidity which is advantageous considering that these elements act as the bearing surface for the first hinge member 110 depending on the orientation of the hinge 101.

The torsion spring 179 is preferably pre-tensioned during assembly of the hinge 101 in the sense that, irrespective of the relative positions of the hinge members 110, 111, the torsion spring 179 always has a minimum amount of energy stored. This ensures that the closure system will be properly closed. This may be achieved by providing openings (not shown) in an outer surface of the annular fixation member 181. Before applying the screws 192, the annular fixation member 181 which holds a torsion spring extremity 180 may be rotated to pre-tension the torsion spring 179. Once the desired amount of tension has been reached the bolts 192 are positioned thus locking the annular fixation member 181 into place with respect to the second hinge member 111. When these steps are undertaken after having positioned the second solid insert 195, i.e. after having fixed the damper shaft 124 to the second hinge member 111, the piston 147 which abuts against the collar 184 will prevent the torsion spring 179 from completely unwinding.

Another difference between the hinges 1, 101 is the placement of the expansion channel 70, 170. In the hinge 101, the expansion channel 170 is also provided in the first hinge member 110, i.e. in the cylinder barrel 117. However, the expansion channel 170 is placed centrally in line with the damper shaft 124. Moreover, the expansion channel 170 is fluidly connected (via passage 172 through the damper shaft 124) to the high pressure compartment 148 of the dashpot in the hinge 101. In order to minimize or avoid influence on the normal operation, the biasing member 174 has a higher compressive strength when compared to biasing member 74.

It will be readily appreciated that the expansion chamber 170 and the torsion spring 179 could be removed from the hinge 101 in which case the first end 122 of the cylinder barrel 117 could be formed at the collar 184. This would result in a very compact hinge 101.

Figure 14:
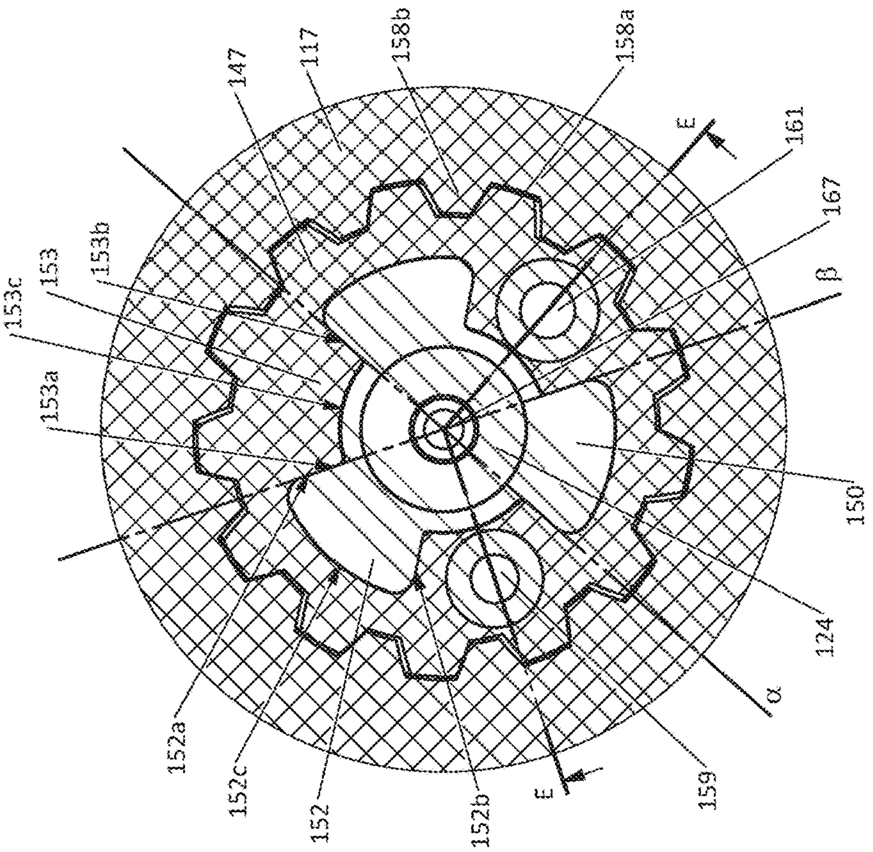
FIG. 14 shows a transverse cross-section through the cylinder barrel along plane A indicated in FIG. 13.
Figure 13:
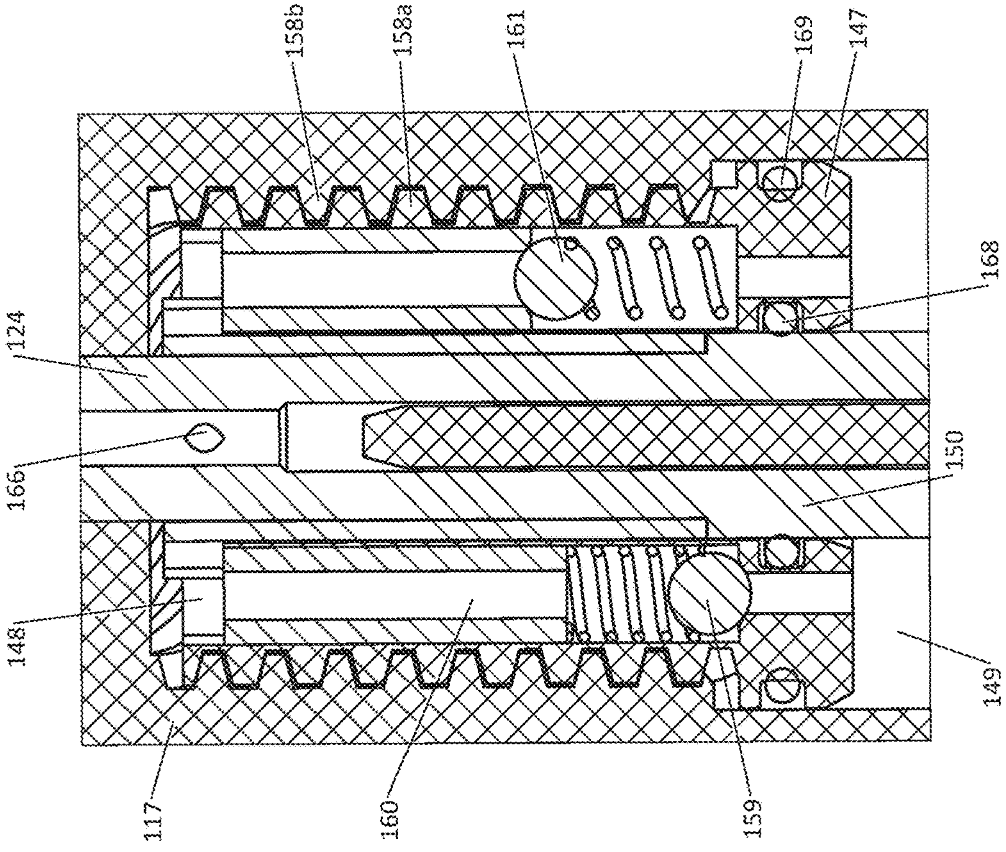
FIG. 13 shows a longitudinal cross-section through the cylinder barrel of the hydraulically damped hinge of FIG. 11 zoomed to the piston area.

Details of the piston 147 will be described with reference to FIGS. 13 and 14. As with the hinge 1, the hinge 101 makes use of a screw thread **158*a* on the outside of the piston 147 that engages a screw thread 158*b* on the cylinder barrel 117. A similar rotation prevention is also used but with three ribs-groove pairs (152, 153) on the inside of the piston 147 and the locking element 150 on the damper shaft 124. The same mechanisms are used to compensate for temperature variations, i.e. a fluid passage 166 within the damper shaft 124 and sealing rings 168, 169 to seal the high pressure compartment 148 with an adjustable valve 167 in the damper shaft 124**.

The main difference between the pistons 47, 147 is that at least two of the ribs 153 on the piston 147 are sufficiently large to place part of the one-way valves 159, 161. This was not the case in the piston 47 such that the one-way valves 59, 61 had to be placed below the screw-threaded part of the piston 47. It has been found that having three ribs 153 allows them to be sufficiently large to accommodate the placement of the one-way valves 159, 161 while still preventing rotation of the piston 147 with respect to the damper shaft 124. This may also be partly due to their specific shape already described above which optimizes force transfer, i.e. the imaginary planes β, β that coincide with each side face **153*a*, 153*b* (which side faces substantially correspond to those of side faces 152*a*, 152*b*) bisect near the longitudinal axis 118 of the damper shaft 124**. A smallest angle between the imaginary planes α, β is about 60° in the illustrated embodiment, but other values are possible.

Figure 15:
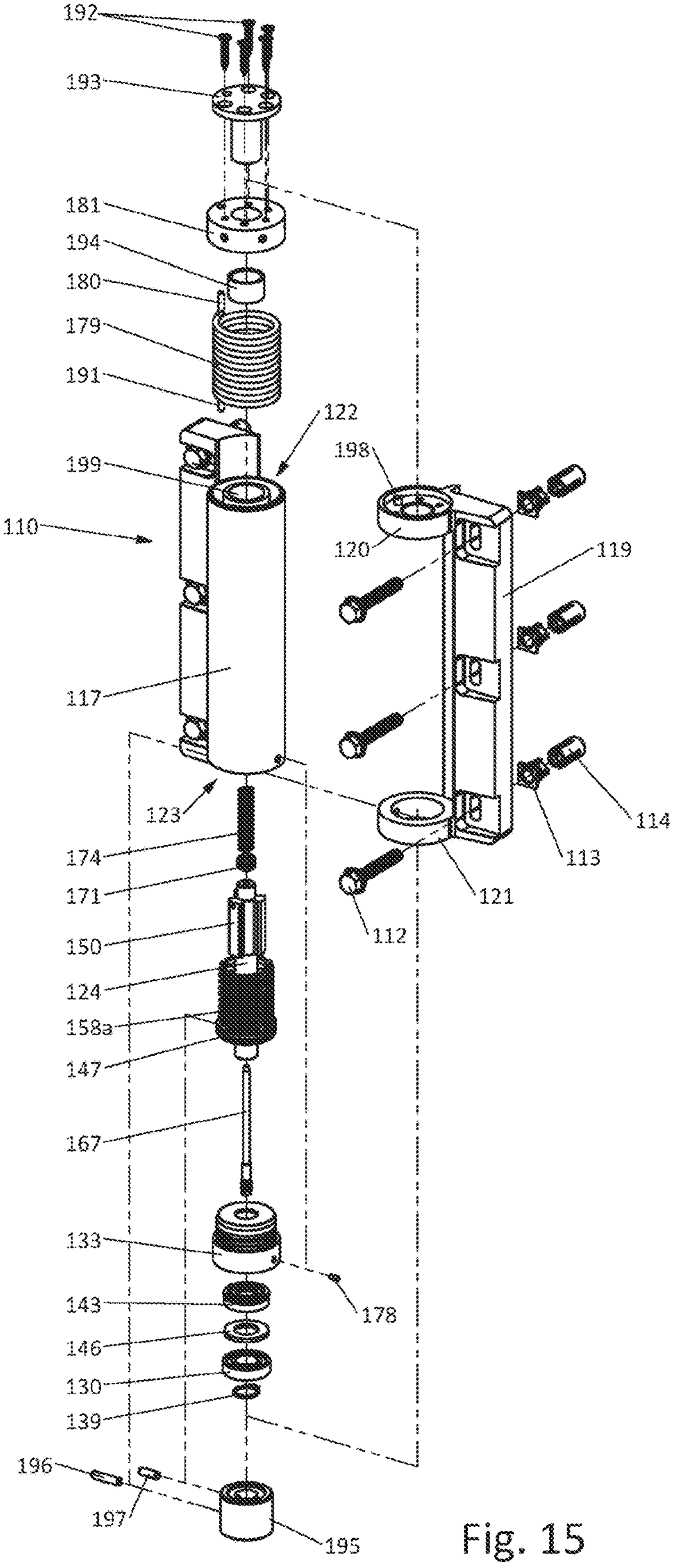
FIG. 15 shows an exploded view of the hydraulically damped hinge of FIG. 11.
Figure 16:
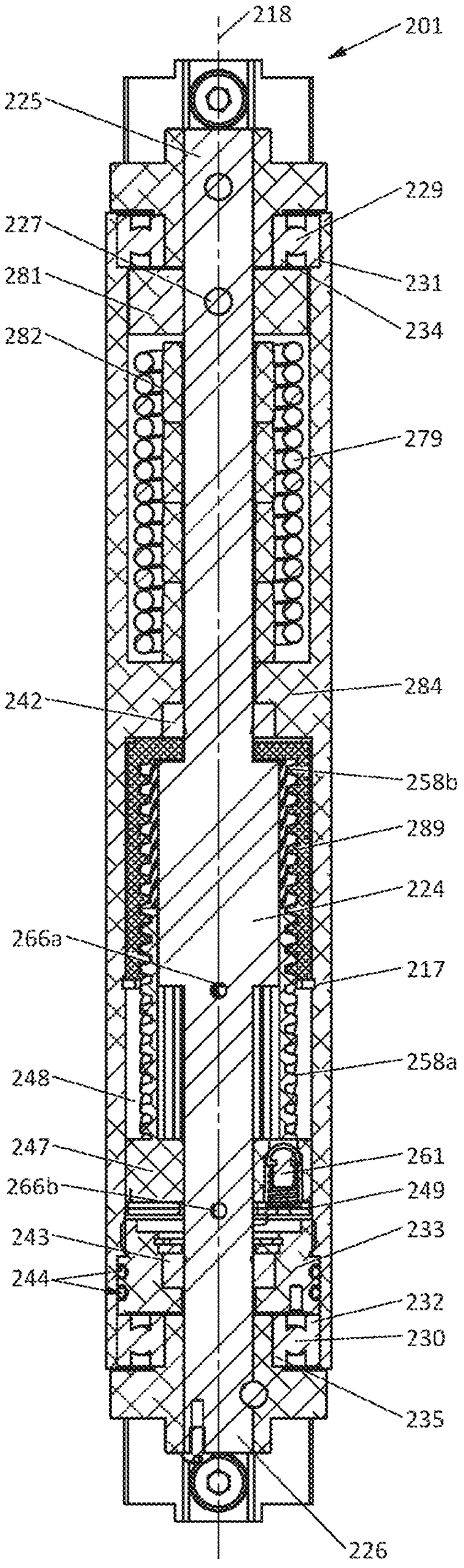
FIG. 16 shows a longitudinal cross-section through an actuator according to the present invention.

FIGS. 16 and 17 illustrate a hydraulically damped actuator 201 for damping a closing movement of a closure member, the actuator 201 including a second embodiment of a dashpot according to the present invention. Elements or components previously described with reference to FIGS. 1 to 15 bear the same last two digits but preceded with number '2' and will not necessarily be described again.

The actuator 201 is of the same kind as the third embodiment actuator described in WO 2018/121890 A1 such that details on how to mount the actuator 201 to the closure system will not be described here but are considered incorporated by reference to FIGS. 15 and 16 of WO 2018/121890 A1 and the accompanying description. When mounted to the closure system, the tubular cylinder barrel 217 of the actuator 201 remains stationary while the damper shaft 224 rotates around its longitudinal axis 218 to transfer the opening and closing motion of the closure member to the dashpot.

The main difference between the dashpot in the actuator 201 and the dashpot in the hinges 1, 101 is that the cylinder barrel 217 is made from metal, while the cylinder barrel 17, 117 is made from a synthetic material. In particular, the tubular cylinder barrel 217 is extrusion moulded from metal, preferably aluminium, with the closed cylinder cavity and the collar 284 being formed therein by bore milling Whilst it is relatively straightforward to provide the external screw thread **58*b*, 158*b* in the wall of the plastic cylinder barrel 17, 117, this becomes much more involved for the metal cylinder barrel 217**.

In order to provide the required external screw thread **258*b* to cooperate with the internal screw thread 258*a* on the outside surface of the piston 247, a plastic hollow guiding element 289 (shown in detail in FIGS. 17A and 17B) is provided. The guiding element 289 is made from a synthetic material, in particular a thermoplastic material. Furthermore, the guiding element 289 is preferably injection moulded. The guiding element 289 is provided with a screw thread 258***b* on its inner wall, which screw thread 258*b* co-operates with the screw thread 258*a* on the outside of the piston 247 in order to convert a rotational motion of the damper shaft 224 into a sliding motion of the piston 247.

Figure 17A:
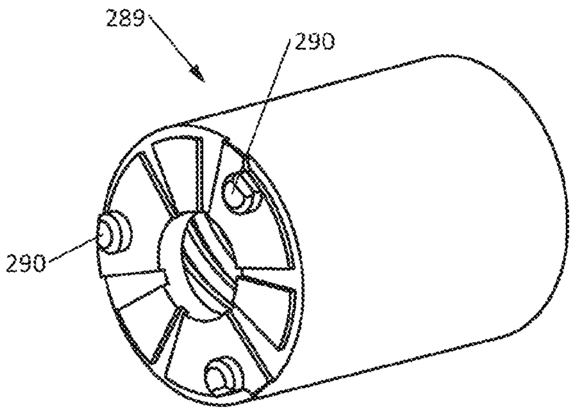
FIGS. 17A and 17B show a perspective view of the hollow plastic tubular element fixed to the cylinder barrel in the actuator of FIG. 16.
Figure 17B:
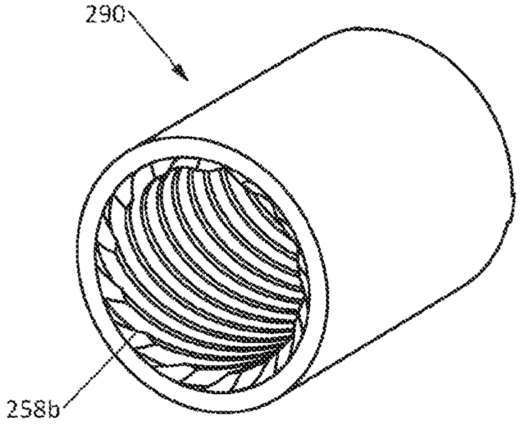

The guiding element 289 fits in the closed cylinder cavity formed in the cylinder barrel 217 and is irrotatably locked therein. FIG. 17A illustrates that the guiding element 289 has at least one projection 290 that fits into a recess (not shown) in the collar 284, which projection 290 ensures that the guiding element 289 is irrotatably fixed to the tubular cylinder barrel 217. Additionally, one or more bolts (not shown) may be used to fix the guiding element 289 to the collar 284, which bolts are to be bolted into corresponding holes (not shown) in the collar 284.

It will be readily appreciated that, in other embodiments, more bolts and/or projections 290 may be used, or that only bolts or only projections 290 may be used to irrotatably lock the guiding element 289 in the closed cylinder cavity. Moreover, other means may be suitable to irrotatably lock the guiding element 289 in the closed cylinder cavity. For example, bolts may be inserted transversally through the tubular cylinder barrel 217 into the guiding element 289.

When the piston 247 is rotated in the closed cylinder cavity, the piston 247 slides with respect to the closed cylinder cavity. In particular, the piston 247 moves towards the seal cap 233 (i.e. the low pressure compartment 249 is reducing in volume as hydraulic fluid flows towards the high pressure compartment 248) when the closure system is being opened and it moves away from the seal cap 233 (i.e. the high pressure compartment 248 is reducing in volume as hydraulic fluid flows towards the low pressure compartment 249) when the closure system is being closed. In the illustrated embodiments, the screw threads 258*a*, 258*b* are therefore right-handed screw threads.

Further details of the dashpot (e.g. the placement of the restricted fluid passage(s), temperature compensation means, etc.) may be similar to those described above for the hinge 1, 101 (i.e. with a sealed high pressure compartment and temperature compensation due to the adjustable valve in the damper shaft) or may be similar to those described in WO 2018/121890 A1 with part of the restricted fluid passage also being formed around the piston in a clearance with the damper shaft and/or the cylinder barrel.

The actuator 201 urges the closure member to its closed position due to the torsion spring 279 that is fixed with one extremity to the annular fixation member 281 that is fixed to the shaft 224 by the transverse pin 227. The other extremity of the torsion spring 279 is fixed in the collar 284.

As already stated above, although the description above and accompanying FIGS. 1 to 15 relate to a hinge, it should be appreciated that certain aspects of the dashpot of the hinge may also be suitable for a dashpot in a hydraulically damped actuator in general, for example the actuators described in WO 2018/228729 A1. Specific reference is made to the composition of the cylinder barrel to replace the aluminium cylinder barrel of WO 2018/228729 A1, the sealing rings on the piston to seal the high pressure compartment, the construction of the restricted fluid passage within the damper shaft, and materials of the adjustable valve, the damper shaft and the piston. Furthermore, these same aspects of the dashpot may also be suitable for a dashpot operating with a non-rotatable damper shaft as disclosed in EP 2 356 304 B 1.

Figure 18:
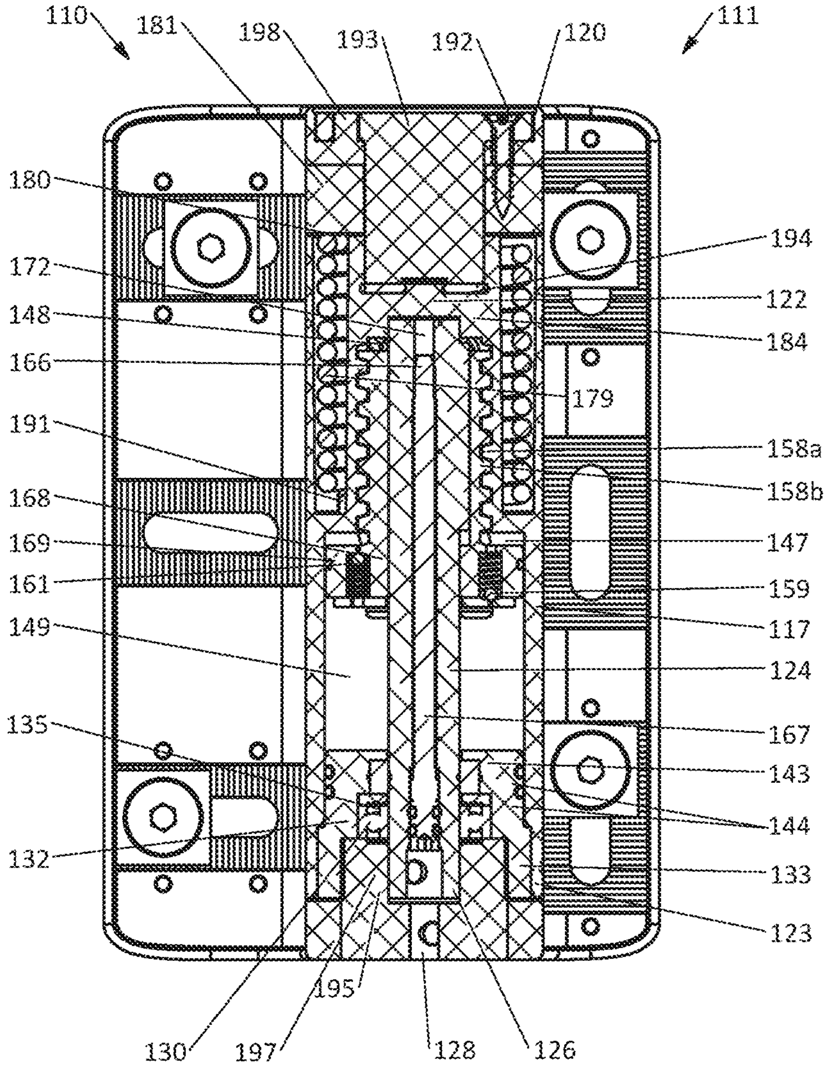
FIG. 18 shows a longitudinal cross-section, along plane A in FIG. 19, through a third embodiment of a hydraulically damped hinge according to the present invention in its closed position, which is similar to the second embodiment of the hinge according to the invention.
Figure 19:
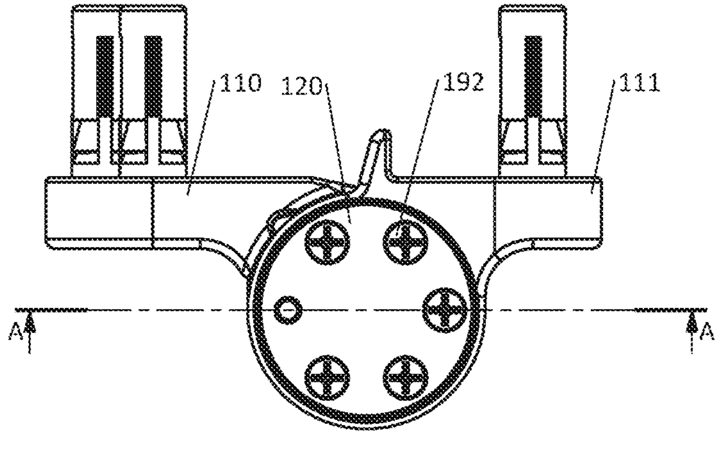
FIG. 19 shows a top view of the hydraulically damped hinge of FIG. 18 in a closed position.

FIGS. 18 and 19 show a further embodiment of the hinge according to the invention which is similar to the second embodiment, illustrated in FIGS. 11 to 15, but which has been made more compact. The same reference numerals have therefore been used and reference can be made to the description of the second embodiment for further details about the construction and the functioning of the more compact embodiment as illustrated in FIGS. 18 and 19. The more compact construction has been obtained by providing an annular space in the portion of the cylinder barrel 117 around the screw threaded portion thereof, i.e. around the piston 147, and by arranging the torsion spring 179 in this space around the screw threaded portion of the cylinder cavity, i.e. around the piston 147. Due to the increased wall thickness of the cylinder barrel 117 as a result of the presence of the annular space for the torsion spring 179, the diameter of the screw threaded portion of the piston 147 has been reduced. The same amount of hydraulic liquid is however displaced by the piston 147 since its portion which slides along the wall of the cylinder cavity and along the damper shaft 124, i.e. its portion which is in particular provided with the seal rings 168 and 169, has the same surface area for displacing the hydraulic liquid. Due to the reduced diameter of the screw threaded portion of the piston 147, the one-way valves 159 and 161 are again arranged in the portion of the piston which slides along the wall of the cylinder cavity and along the damper shaft 124 in the same way as in the first embodiment illustrated in FIGS. 3C and 3D.

The screw thread 158*a* on the piston 147 has in this embodiment a smaller diameter, for example an outer diameter of 26 mm instead of 36 mm. To achieve the same lead of 60 mm, the helix angle has to be somewhat larger in this embodiment, namely the helix angle has to be 36° instead of 28°.

In the embodiment illustrated in FIGS. 18 and 19 no thermal expansion chamber has been provided. Such an expansion chamber can however be provided for example, as in the embodiment illustrated in FIG. 6, in the wall of the cylinder barrel.

Figure 20:
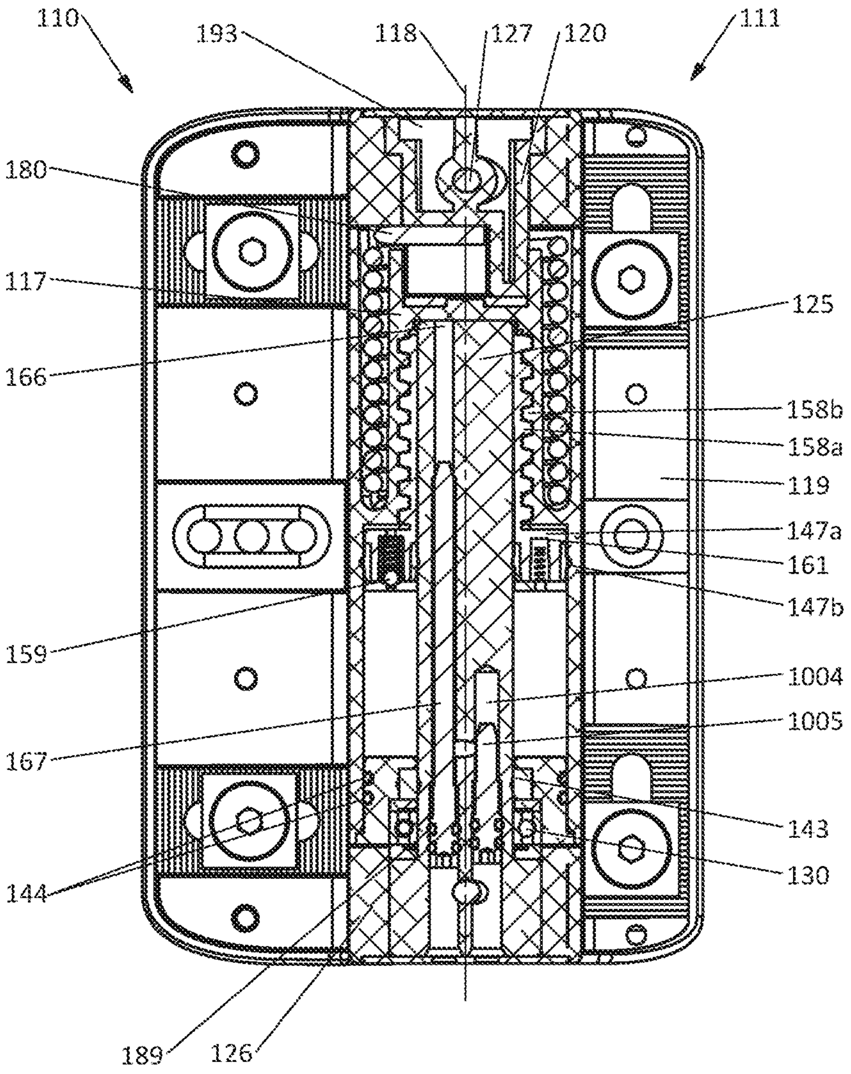
FIG. 20 shows a longitudinal cross-section through a fourth embodiment of a hydraulically damped hinge according to the present invention in its closed position, which is similar to the third embodiment of the hinge according to the invention.
Figure 21B:
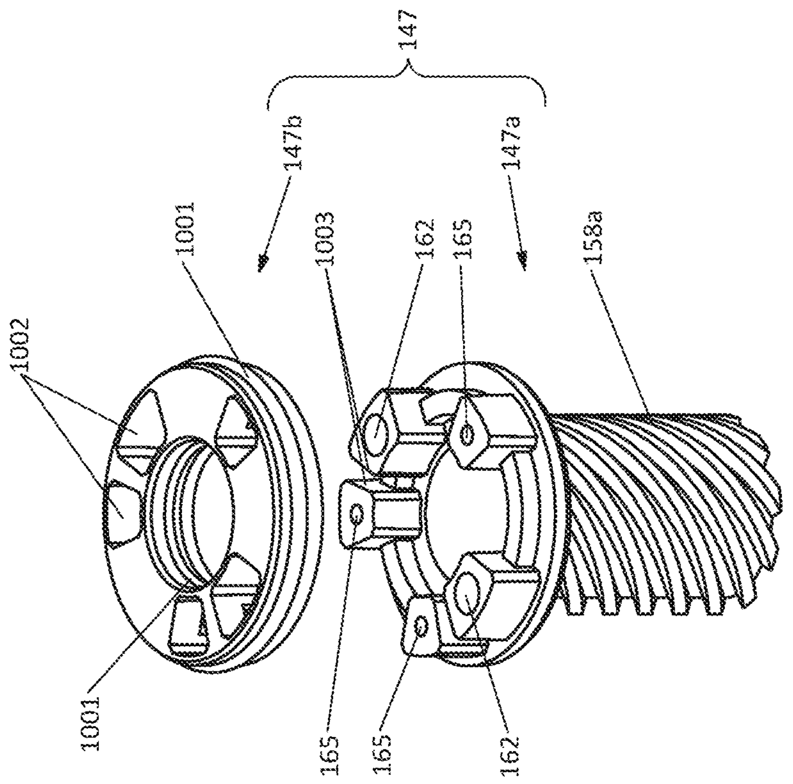
FIGS. 21A and 21B shows a perspective view of the piston used in the hydraulically damped hinge of FIG. 20.
Figure 21A:
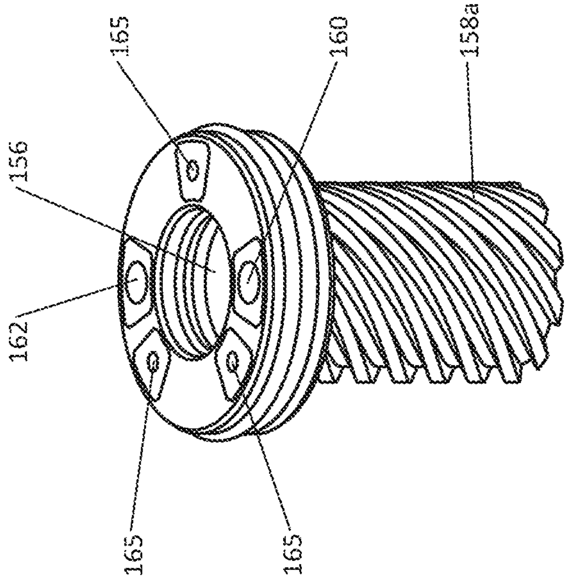
Figure 22:
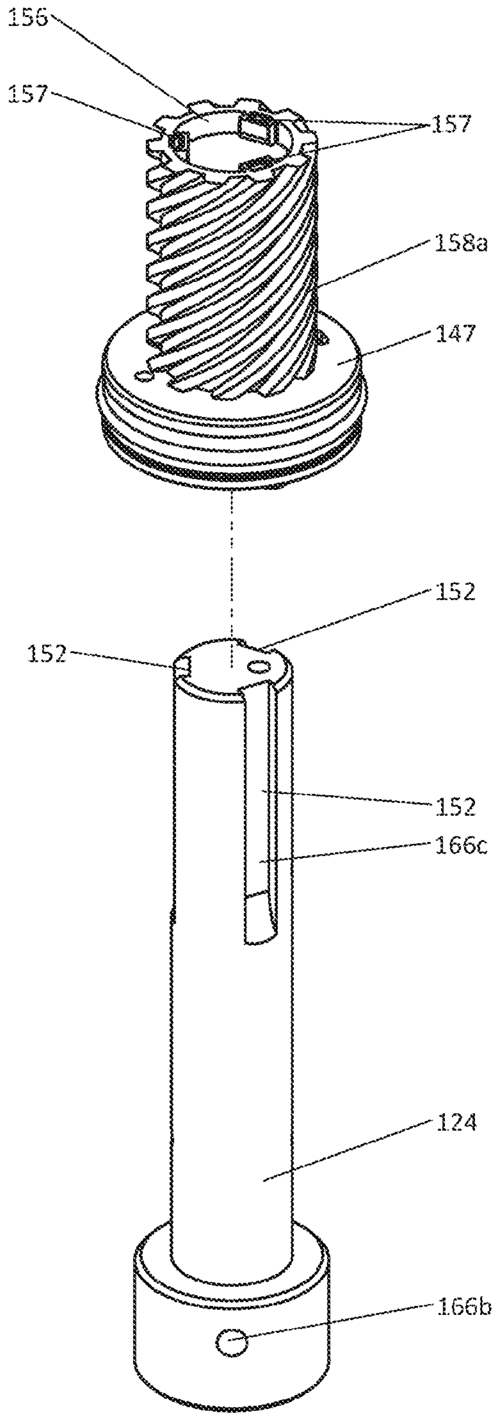
FIG. 22 shows a perspective view of how the piston is mounted on the damper shaft in the hydraulically damped hinge of FIG. 20.

FIGS. 20 to 22 show a further embodiment of the hinge according to the invention which is similar to the second and third embodiments, illustrated in FIGS. 11 to 15 and 18 to 19, but which has a different piston assembly and a different piston-damper shaft connection. The same reference numerals have therefore been used in so far as possible while new elements not included in earlier embodiments have been denoted by reference numbers 1001-1005. Reference can be made to the description of the other embodiments for further details about the construction and the functioning of the embodiment as illustrated in FIGS. 20 to 22.

One difference in the embodiment illustrated in FIGS. 20 to 22 is that the sealing rings 168, 169 are formed by a single sealing member denoted with reference number 147*b*. In this embodiment, the piston 147 is constructed from a base part 147*a* and a sealing member 147*b*. The main advantage thereof is that the piston 147 may be made by multi-material injection moulding, in particular over-moulding, such that both the base 147*a* and the sealing member 147*b* are formed within a single process. Alternatively, the piston parts 147*a*, 147*b* may be made in separate manufacturing processes and joined together as a last step. The two-part piston 147 is best shown in FIGS. 21A and 21B. The base part 147*a* is provided with multiple projections 1003 through which the fluid passages 160, 162 extend and in which screw holes 165 are provided. Corresponding holes 1002 are provided in the sealing member 147*b*. Due to the specific manufacturing process of the piston 147, the sealing member 147*b* is provided with central seams 1001. The seams 1001 cause a local increase in diameter of the sealing member 147*b* thereby improving the seal against the cylinder barrel 117 and the damper shaft 124.

The base part 147*a* is typically made from a harder and/or more robust polymeric material in comparison to the sealing member 147*b*. For example, the base 147*a* is made from a glass fibre reinforced polymeric material, while the sealing member 147*b* is made from a further polymeric material, in particular polyoxymethylene, which is less abrasive than said glass fibre reinforced polymeric material and which is in particular non-abrasive. The further polymeric material layer is preferably free of hard fibres which have in particular a Mohs hardness higher than 4.0. It will be appreciated that the base 147*a* may also be made from other polymeric materials, incl. non-fibre reinforced polymeric materials. The sealing member 147*b* may likewise be made from a variety of materials. Polymeric materials, in particular thermoplastic materials such as polyurethane or rubber, are preferred as these enable to cost-efficiently fabricate the sealing member 147*b*. Specific examples are EPDM rubber, a thermoplastic elastomer and nitrile rubber.

A further difference in the embodiment of FIGS. 20 to 22 is that the coupling between the piston 147 and the damper shaft 124 is reversed. More specifically, grooves 152 are provided in the damper shaft 124 while protrusions (in particular ridges) 157 are provided inside the piston 147. The grooves 152 and protrusions 157 interlock with one another to couple the piston 147 to the damper shaft 124. The grooves 152 extend to the end face of the damper shaft 124 to allow sliding the piston 147 onto the damper shaft 124. This forms an alternative to the locking member 50 described with reference to the embodiment of FIGS. 1 to 10. The advantage of this embodiment is that less volume is used for the coupling since grooves are provided in the damper shaft instead of ridges being provided thereon. This allows to include a larger volume of hydraulic fluid in the closed cylinder cavity thus improving operation reliability as described above. Alternatively, the total volume of the closed cylinder cavity may be decreased, thus decreasing the size of the hinge, while maintaining the same volume of hydraulic fluid.

Another difference in the embodiment of FIGS. 20 to 22 is that another fluid passage 1004 with a second, preferably adjustable, valve 1005 (e.g. a needle valve) is provided between the compartments 148, 149 of the closed cylinder cavity as described in WO 2018/228729. This second fluid passage 1004 forms a by-pass which causes an increase of the closing speed at the end of the closing movement, i.e. a final snap, to ensure that the closure system is reliably closed.

In the embodiment illustrated in FIGS. 20 to 22 no thermal expansion chamber has been provided. Such an expansion chamber can however be provided for example, as in the embodiment illustrated in FIG. 6, in the wall of the cylinder barrel.

Although aspects of the present disclosure have been described with respect to specific embodiments, it will be readily appreciated that these aspects may be implemented in other forms within the scope of the invention as defined by the claims.

The invention claimed is:

1. A dashpot for damping a closing movement of a closure system having a support and a closure member that are hingedly connected to each other, the dashpot comprising:

a plastic cylinder barrel having a longitudinal direction;

a closed cylinder cavity formed within the cylinder barrel and being filled with a volume of hydraulic fluid;

a damper shaft which extends into the cylinder cavity, the cylinder barrel and the damper shaft being rotatable with respect to one another about a rotation axis which is substantially parallel to the longitudinal direction;

a piston within said cylinder cavity which is operatively coupled to said damper shaft to be slideable between two extreme positions in said longitudinal direction upon a relative rotation between said cylinder barrel and said damper shaft; and a motion converting mechanism to convert the relative rotation between said cylinder barrel and said damper shaft into a sliding motion of the piston, the motion converting mechanism comprising two screw threads which are arranged to cooperate with one another so that upon a relative rotation between said cylinder barrel and said damper shaft in a first rotational direction the piston moves along the damper shaft in a first direction whilst upon a relative rotation between said cylinder barrel and said damper shaft in a second rotational direction, which is opposite to the first rotational direction, the piston moves along the damper shaft in a second direction, which is opposite to the first direction, the first and second directions being substantially parallel to the longitudinal direction, characterized in that a first one of said two screw threads is provided on an outer wall of the piston and a second one of said two screw threads is provided on an inner wall of the cylinder barrel, with the piston being slideable along said longitudinal direction on said damper shaft and with a rotation prevention system being provided between the piston and said damper shaft for preventing rotation of the piston with respect to the damper shaft.

2. A dashpot for damping a closing movement of a closure system having a support and a closure member that are hingedly connected to each other, the dashpot comprising:

a metal cylinder barrel having a longitudinal direction;

a closed cylinder cavity formed within the cylinder barrel and being filled with a volume of hydraulic fluid;

a damper shaft which extends into the cylinder cavity, the cylinder barrel and the damper shaft being rotatable with respect to one another about a rotation axis which is substantially parallel to the longitudinal direction;

a piston within said cylinder cavity which is operatively coupled to said damper shaft to be movable between two extreme positions in said longitudinal direction upon a relative rotation between said cylinder barrel and said damper shaft; and a motion converting mechanism to convert the relative rotation between said cylinder barrel and said damper shaft into a sliding motion of the piston, the motion converting mechanism comprising:

a plastic tubular element that is fixed to said cylinder barrel; and two screw threads which are arranged to cooperate with one another so that upon a relative rotation between said cylinder barrel and said damper shaft in a first rotational direction the piston moves along the damper shaft in a first direction whilst upon a relative rotation between said cylinder barrel and said damper shaft in a second rotational direction, which is opposite to the first rotational direction, the piston moves along the damper shaft in a second direction, which is opposite to the first direction, the first and second directions being substantially parallel to the longitudinal direction, characterized in that a first one of said two screw threads is provided on an outer wall of the piston and a second one of said two screw threads is provided on an inner wall of the plastic tubular element, with the piston being slideable along said longitudinal direction on said damper shaft and with a rotation prevention system being provided between the piston and said damper shaft for preventing rotation of the piston with respect to the damper shaft.

3. The dashpot according to claim 1, characterized in that the piston divides the closed cylinder cavity into a high pressure compartment and a low pressure compartment, wherein the dashpot further comprises:

a one-way valve allowing fluid flow from the low pressure compartment to the high pressure compartment when said closure member is being opened; and a restricted fluid passage between the high pressure compartment and the low pressure compartment which determines a closing speed of the closure member, wherein said screw threads are disposed within the high pressure compartment.

4. The dashpot according to claim 1, characterized in that the damper shaft extends through the piston, at least one first sealing ring being provided between the piston and the cylinder barrel and at least one second sealing ring being provided between the piston and the damper shaft.

5. The dashpot according to claim 4, characterized in that the sealing rings are formed by an integrally formed sealing member.

6. The dashpot according to claim 5, characterized in that the piston comprises a base and the sealing member, wherein the piston is formed by multi-material injection over-moulding.

7. The dashpot according to claim 1, characterized in that the rotation prevention system comprise:

at least one rib provided on one of the damper shaft and an inner surface of the piston, each rib having two side faces and a front connecting the side faces, wherein the imaginary planes ($\alpha$, $\beta$) that are tangent to the side faces are either radial planes bisecting substantially near the rotation axis of the damper shaft or form an angle of at most 10° with a radial plane containing said rotation axis and passing through the middle of said side faces; and at least one groove provided on the other one of the damper shaft and the inner surface of the piston, the groove being arranged to cooperate with the at least one rib.

8. The dashpot according to claim 1, characterized in that the dashpot is configured to be non-rotatably fixed to the closure system with its longitudinal axis in a first orientation for a right-handed closure member and in a second orientation, opposite to the first orientation, for a left-handed closure member.

9. The dashpot according to claim 1, characterized in that said screw threads each have at least 5 starts.

10. The dashpot according to claim 1, characterized in that said threads each have a lead of at least 30 mm.

11. The dashpot according to claim 1, characterized in that said threads each have a helix angle of less than 45°.

12. The dashpot according to claim 1, characterized in that the damper shaft is made of metal.

13. The dashpot according to claim 1, characterized in that the piston is made of a fiber reinforced polymeric material.

14. A hydraulically damped actuator for damping a closing movement of a closure system having a support and a closure member that are hingedly connected to each other, characterized in that the actuator comprises a dashpot according to claim 1.

15. A hydraulically damped hinge for hinging a closure member to a support, the hinge comprising:

a first hinge member configured to be fixed to one of: the support and the closure member, the first hinge member comprising a cylinder barrel having a longitudinal direction; and a second hinge member pivotably mounted on the first hinge member, the second hinge member being configured to be fixed to the other one of: the support and the closure member, characterized in that said hinge members are made of a synthetic material and in that the hinge further comprises a dashpot according to claim 1 with the damper shaft being connected to the second hinge member.

16. The hinge according to claim 15, characterized in that the second hinge member comprises:

a first tubular part at the first end of the cylinder barrel; and a second tubular part adjacent the second end of the cylinder barrel, said tubular parts being substantially aligned with the cylinder barrel and being connected to one another, wherein at least one roller bearing is provided between the damper shaft and the first hinge member and wherein the first hinge member is supported by the second hinge member through the intermediary of a first thrust bearing disposed between the cylinder barrel and the first tubular part and through the intermediary of a second thrust bearing disposed between the cylinder barrel and the second tubular part, said roller bearing having in particular an outer race interposed between the first hinge member and the second hinge member to support the first hinge member.

17. A set of hinges for hinging a closure member to a support, characterized in that the set comprises:

a hydraulically damped hinge according to claim 15; and a further hinge comprising a first further hinge member configured to be fixed to one of: the support and the closure member and a second further hinge member pivotably mounted on the first further hinge member, the second further hinge member being configured to be fixed to the other one of: the support and the closure member, wherein an energy storing mechanism is provided in at least one of the hydraulically damped hinge and the further hinge, the energy storing mechanism being configured for storing energy when said closure member is being opened and for restoring said energy to effect closure of said closure member, the energy storing mechanism comprising a torsion spring having a first extremity connected to one of the first hinge member and the first further hinge member and a second extremity connected to a corresponding one of the second hinge member and the second further hinge member.

18. The set according to claim 17, characterized in that the energy storing mechanism comprises a torsion spring disposed in the hydraulically damped hinge with its first extremity being connected to the first hinge member and with its second extremity being connected to the second hinge member.

19. The set according to claim 18, characterized in that the torsion spring defines a hypothetical cylinder with said at least said two screw threads being located substantially inside said hypothetical cylinder.

20. The set according to claim 18, characterized in that the energy storing mechanism comprises a further torsion spring disposed in the further hinge with its first extremity being connected to the first further hinge member and with its second extremity being connected to the second further hinge member.

21. The set according to claim 20, characterized in that the energy storing mechanism comprises at least a third torsion spring, the second torsion spring being disposed in the hydraulically damped hinge with its first extremity being connected to the first hinge member and with its second extremity being connected to the first tubular part and the third torsion spring being disposed in the hydraulically damped hinge with its first extremity being connected to the first hinge member and with its second extremity being connected to the second tubular part.

22. The dashpot according to claim 2, characterized in that the piston divides the closed cylinder cavity into a high pressure compartment and a low pressure compartment, wherein the dashpot further comprises:

a one-way valve allowing fluid flow from the low pressure compartment to the high pressure compartment when said closure member is being opened; and a restricted fluid passage between the high pressure compartment and the low pressure compartment which determines a closing speed of the closure member, wherein said screw threads are disposed within the high pressure compartment.

23. The dashpot according to claim 2, characterized in that the damper shaft extends through the piston, at least one first sealing ring being provided between the piston and the cylinder barrel and at least one second sealing ring being provided between the piston and the damper shaft.

24. The dashpot according to claim 23, characterized in that the sealing rings are formed by an integrally formed sealing member.

25. The dashpot according to claim 24, characterized in that the piston comprises a base and the sealing member, wherein the piston is formed by multi-material injection over-moulding.

26. The dashpot according to claim 2, characterized in that the rotation prevention system comprise:

at least one rib provided on one of the damper shaft and an inner surface of the piston, each rib having two side faces and a front connecting the side faces, wherein the imaginary planes ($\alpha$, $\beta$) that are tangent to the side faces are either radial planes bisecting substantially near the rotation axis of the damper shaft or form an angle of at most 10° with a radial plane containing said rotation axis and passing through the middle of said side faces; and at least one groove provided on the other one of the damper shaft and the inner surface of the piston, the groove being arranged to cooperate with the at least one rib.

27. The dashpot according to claim 2, characterized in that the dashpot is configured to be non-rotatably fixed to the closure system with its longitudinal axis in a first orientation for a right-handed closure member and in a second orientation, opposite to the first orientation, for a left-handed closure member.

28. The dashpot according to claim 2, characterized in that said screw threads each have at least 5 starts.

29. The dashpot according to claim 2, characterized in that said threads each have a lead of at least 30 mm.

30. The dashpot according to claim 2, characterized in that said threads each have a helix angle of less than 45°.

31. The dashpot according to claim 2, characterized in that the damper shaft is made of metal.

32. The dashpot according to claim 2, characterized in that the piston is made of a fiber reinforced polymeric material.

33. A hydraulically damped actuator for damping a closing movement of a closure system having a support and a closure member that are hingedly connected to each other, characterized in that the actuator comprises a dashpot according to claim 2.

34. A hydraulically damped hinge for hinging a closure member to a support, the hinge comprising:

a first hinge member configured to be fixed to one of: the support and the closure member, the first hinge member comprising a cylinder barrel having a longitudinal direction; and a second hinge member pivotably mounted on the first hinge member, the second hinge member being configured to be fixed to the other one of: the support and the closure member, characterized in that said hinge members are made of a synthetic material and in that the hinge further comprises a dashpot according to claim 2 with the damper shaft being connected to the second hinge member.

35. The hinge according to claim 34, characterized in that the second hinge member comprises:

a first tubular part at the first end of the cylinder barrel; and a second tubular part at the second end of the cylinder barrel, said tubular parts being substantially aligned with the cylinder barrel and being connected to one another, wherein at least one roller bearing is provided between the damper shaft and the first hinge member and wherein the first hinge member is supported by the second hinge member through the intermediary of a first thrust bearing disposed between the cylinder barrel and the first tubular part and through the intermediary of a second thrust bearing disposed between the cylinder barrel and the second tubular part, said roller bearing having in particular an outer race interposed between the first hinge member and the second hinge member to support the first hinge member.

36. A set of hinges for hinging a closure member to a support, characterized in that the set comprises:

a hydraulically damped hinge according to claim 34; and a further hinge comprising a first further hinge member configured to be fixed to one of: the support and the closure member and a second further hinge member pivotably mounted on the first further hinge member, the second further hinge member being configured to be fixed to the other one of: the support and the closure member, wherein an energy storing mechanism is provided in at least one of the hydraulically damped hinge and the further hinge, the energy storing mechanism being configured for storing energy when said closure member is being opened and for restoring said energy to effect closure of said closure member, the energy storing mechanism comprising a torsion spring having a first extremity connected to one of the first hinge member and the first further hinge member and a second extremity connected to a corresponding one of the second hinge member and the second further hinge member.

37. The set according to claim 36, characterized in that the energy storing mechanism comprises a torsion spring disposed in the hydraulically damped hinge with its first extremity being connected to the first hinge member and with its second extremity being connected to the second hinge member.

38. The set according to claim 37, characterized in that the torsion spring defines a hypothetical cylinder with said at least said two screw threads being located substantially inside said hypothetical cylinder.

39. The set according to claim 37, characterized in that the energy storing mechanism comprises a further torsion spring disposed in the further hinge with its first extremity being connected to the first further hinge member and with its second extremity being connected to the second further hinge member.

40. The set according to claim 39, characterized in that the energy storing mechanism comprises at least a third torsion spring, the second torsion spring being disposed in the hydraulically damped hinge with its first extremity being connected to the first hinge member and with its second extremity being connected to the first tubular part and the third torsion spring being disposed in the hydraulically damped hinge with its first extremity being connected to the first hinge member and with its second extremity being connected to the second tubular part.

* * * * *